(12) United States Patent
Barnett et al.

(10) Patent No.: US 6,733,225 B1
(45) Date of Patent: May 11, 2004

(54) COUNTER-LATCH FOR A SELF-DUMPING HOPPER

(75) Inventors: Ralph Lipsey Barnett, Wilmette, IL (US); William Brown, LaGrange Park, IL (US); Charles Sinkovits, Norridge, IL (US)

(73) Assignee: Triodyne Safety Systems, Inc., Niles, IL (US)

( * ) Notice: Subject to any disclaimer, the term of this patent is extended or adjusted under 35 U.S.C. 154(b) by 0 days.

(21) Appl. No.: 10/273,654

(22) Filed: Oct. 18, 2002

(51) Int. Cl.[7] .................................................. B65G 65/04

(52) U.S. Cl. ....................... 414/420; 298/38; 298/230

(58) Field of Search ................................. 414/419–421, 414/425; 298/38, 230, 297, 298, 304

(56) References Cited

U.S. PATENT DOCUMENTS

| 1,497,348 A | * | 6/1924 | Reichmann | 298/38 |
| 2,677,575 A | * | 5/1954 | Phillips | 298/38 |
| 3,273,755 A | * | 9/1966 | Shomo | 298/38 |
| 5,364,224 A | * | 11/1994 | Padgett | 414/419 |
| 5,951,230 A | * | 9/1999 | Kruzick et al. | 414/421 |

* cited by examiner

*Primary Examiner*—Joseph E. Valenza
(74) *Attorney, Agent, or Firm*—Pauley Petersen & Erickson

(57) ABSTRACT

A counter latch system and method of operation of a hopper having a payload and a latch moveable between a latched position and an unlatched position, the system and method including unlatching a latch of the hopper into the unlatched position and deploying a counter latch to maintain the latch in the unlatched position prior to dumping. The hopper is subsequently responsively returned into the latched position as the hopper is returned from dumping the payload.

31 Claims, 25 Drawing Sheets

COUNTER-LATCH FOR A SELF-DUMPING HOPPER

BACKGROUND OF THE INVENTION

1. Field of the Invention

This invention relates to a self dumping hopper that permits safe operation of the hopper by a single operator.

2. Description of Related Art

Self dumping hoppers are typically used in industrial settings to hold and contain waste, finished materials, raw materials and/or other bulk materials or products that require loading and unloading through a dumping operation. As such, self dumping hoppers typically operate between a latched position, such as shown in FIG. 1, and a dumping position, such as shown in FIG. 2.

The self dumping hopper is typically supported on the tines of a forklift truck which enter the fork pockets in the base in the same fashion that a pallet is handled. When unlatched, gravity maintains the hopper on a gear-like track that causes it to both dump and move forward in synchronization. When the base and track are level, an empty or uniformly loaded hopper will tend to rotate forward which causes its center of gravity to move even further forward to accelerate the dumping action. The forward tilt capability of the forklift mast may be used to move the center of gravity of an empty or loaded hopper in a forward direction; conversely, rear tilt moves the center of gravity rearward which diminishes the tendency of the hopper to dump and usually urges it into a rearward rest position against its stops.

When the hopper is in its latched position it may be used for loading, storing, or transporting lading. The latched position is maintained by a latching system that is typified in FIG. 3. The latch is comprised of a hopper mounted latch pin, a frame mounted hook which is spring loaded to engage the pin, and a handle integral with the hook for manual disengagement.

Normally, self-dumping hoppers are strategically located in a factory setting and simply rest with their base on a floor or ground surface. When filled, the latched self-dumping hopper is transported as a conventional forklift load. The hopper is lifted a few inches off the surface with the forklift's mast fully tilted rearward and it is then moved slowly to a container, dumpster or other receptacle. The hopper is positioned for dumping, the forklift is put into neutral with the parking brake set, and then the forks are raised sufficiently high to avoid horizontal interference with the container when the self-dumping hopper moves fully forward. Raising the trip lever handle manually from the ground, or manually from the forklift using a pole, and with the forklift mast vertical, begins the dump cycle under this one-person operation by unlatching the latch hook from the latch pin. Under uniform hopper loading, the hopper dumps automatically.

Occasionally, the hopper may be heavily loaded with its center of gravity biased forward. This creates a large upward force on the hook which cannot be overcome by manually lifting the trip lever handle or pushing up on it with a pole. This upward force becomes smaller and smaller as the mast is continually tilted rearward to ease this upward force. With the upward force sufficiently eased, a one-person dumping operation as previously described is again undertaken.

Normally, in the extreme position where the mast is fully tilted inboard, the unlatching resistance is provided solely by the torsion latch spring; the loaded hopper no longer contributes to the latching resistance because its center of gravity has shifted rearward. Here, the hopper easily unlatches; however, it will relatch immediately if the trip lever handle is released. Unfortunately, the full inboard mast orientation precludes dumping by a single operator. One person cannot maintain the hopper in an unlatched state and mount the forklift and lift the mast forward to dump.

The situation can be handled by a two-person dumping operation. In a two-person operation, the trip lever handle may be held in the upward or unlatched condition by a ground man while the forklift operator begins the dump cycle by tilting the mast forward.

In a one-person protocol for this situation, the operator must seek an intermediate mast tilt between "rearward to release the hook" and "not too far rearward that the hook relatches." Trial and error is used to establish an appropriate mast angle in a range where one finds "release without relatching."

To restore the hopper to its inboard latched position after dumping, several methods may be employed: (a) the mast may be tilted rearward; (b) the forklift may be backed up slightly and then stopped abruptly; (c) a pole may be used to push up on the front of the hopper; and/or (d) the forks may be lowered to the ground and the empty hopper may be lifted by hand.

SUMMARY OF THE INVENTION

Accordingly, it is one object of this invention to provide a system for a self-dumping hopper which permits the hopper dumping to be effected as a one-person operation regardless of whether the center of gravity of the loaded fork lifted hopper is biased rearward, balanced, or biased forward when the forklift mast is tilted rearward to aid in the unlatching of the hopper to initiate its dumping.

It is another object of this invention to provide a system for a self-dumping hopper that minimizes the physical exertions required to overcome the trip lever resistance encountered when unlatching the hopper to initiate dumping, by permitting the unlatching to be done with the forklift mast fully tilted rearward regardless of whether the center of gravity of the loaded fork lifted hopper is biased rearward, balanced, or biased forward.

It is another object of this invention to provide a system for a self-dumping hopper that does not require that the forklift operator contact the hopper body when the hopper is elevated for dumping or when the hopper body is in motion while dumping.

It is another object of this invention to provide a system for a self-dumping hopper that does not require trial and error balancing procedures to initiate dumping.

It is another object of this invention to provide a system for a self-dumping hopper that does not require a pull cord for unlatching the hopper to initiate dumping, in order to achieve the objects of this invention described above.

These and other objects of this invention are addressed by a counter latch system for a self-dumping hopper to be described below. A suitable system would satisfy the following qualifications: (a) it should initiate the dumping cycle at the rearmost position of mast tilt where unlatching the hopper is least strenuous; (b) it may be optionally deployed to prevent relatching at extreme rearward mast angles, or it may be ignored to leave the original system unaltered; (c) it should be located near the hopper latching system where it can be manually engaged at ground level; (d) after the system is engaged, it must automatically cause the original latching system to return to a relatching position when the hopper moves forward, thereby permitting conventional relatching after the lading is dumped.

Several embodiments of a hopper mounted counter latch system invention will be disclosed, each of which fulfills all of the foregoing qualifications. The counter latch system invention embodiments are utilized when the forklift mast, fully tilted rearward, causes the center of gravity of the loaded fork lifted hopper to be biased rearward or be balanced. As previously described for this situation, to initiate dumping, the hopper latch trip lever handle must be typically raised manually and kept manually in the raised position, or else, if released, the counter torque of its return spring will relatch the hopper and prevent the dumping operation. Deploying the counter latch system obviates the necessity to manually keep the hopper trip lever handle in the raised position.

All embodiments of the counter latch system of the present invention accomplish this by manually interposing a blocking member into the return path of the hopper release handle after the handle is manually moved to initiate the hopper release for dumping, thereby preventing the release handle from relatching the hopper with its hopper latching hook. The counter latch blocking member is released automatically from its deployed position and returns automatically to its undeployed position when the forward motion of the dumping hopper causes the handle to clear the deployed blocking member of the counter latch. This allows the hopper release handle with its hopper latching hook to return to its relatching mode. Thus, the operation of the counter latch system of this invention does not interfere with the hopper dumping procedure and the return of the empty hopper to its latched and locked position after dumping.

A hopper with a counter latch system according to this invention is operated as follows. All loading, storing, and transporting of self-dumping hoppers proceed as normal with the hopper in a latched position and the counter latch at home base with the blocking member undeployed and flat against the hopper panel. When a filled hopper arrives at its dump site, the associated forklift has its mast fully retracted and its forks lowered. Either the forklift operator or ground personnel begin the dumping scenario by first lifting the hopper trip lever handle; minimum resistance to lifting the trip lever handle will be encountered because the mast is fully retracted. While holding the handle in one hand, the counter latch blocking member may be deployed with the other hand and the handle suitably seated against the member.

The area is cleared of ground personnel and the seated forklift operator raises the hopper to the proper dumping elevation and tilts the mast of the forklift forward to begin dumping. The forward motion of the dumping hopper causes the counter latch blocking member to release the hopper latch handle. This, in turn, causes the handle with its latching hook to automatically return to its latching ready state by its return spring, and causes the blocking member to automatically return to its undeployed state by means of a spring or gravity.

With the blocking member in its undeployed state, the empty hopper can now be returned and relatched to its upright position using the usual techniques. Thus, the counter latch is typically used only in the beginning of the dump cycle.

The counter latch system according to one preferred embodiment of this invention is mounted on the rear panel of the hopper. According to other preferred embodiments of this invention, the counter latch system may be mounted on either the latch handle or the latch base. An objective of the counter latch system for the self dumping hopper is that the latch handle is propped up after the hopper is unlatched in the extreme rearward tilt position and the counter latch is caused to return to its original position after the hopper moves forward in its dumping motion.

BRIEF DESCRIPTION OF THE DRAWINGS

These and other objects and features of this invention will be better understood from the following descriptions taken in conjunction with the drawings wherein.

DETAILED DESCRIPTION OF THE PREFERRED EMBODIMENTS

Figure 1:
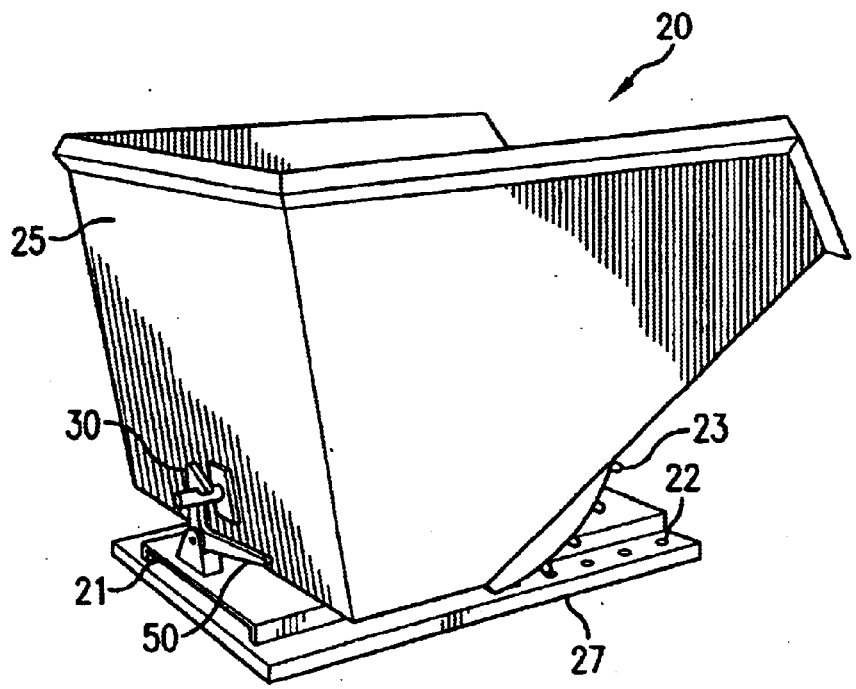
FIG. 1 is a side perspective view of a prior art hopper in a latched position.
Figure 2:
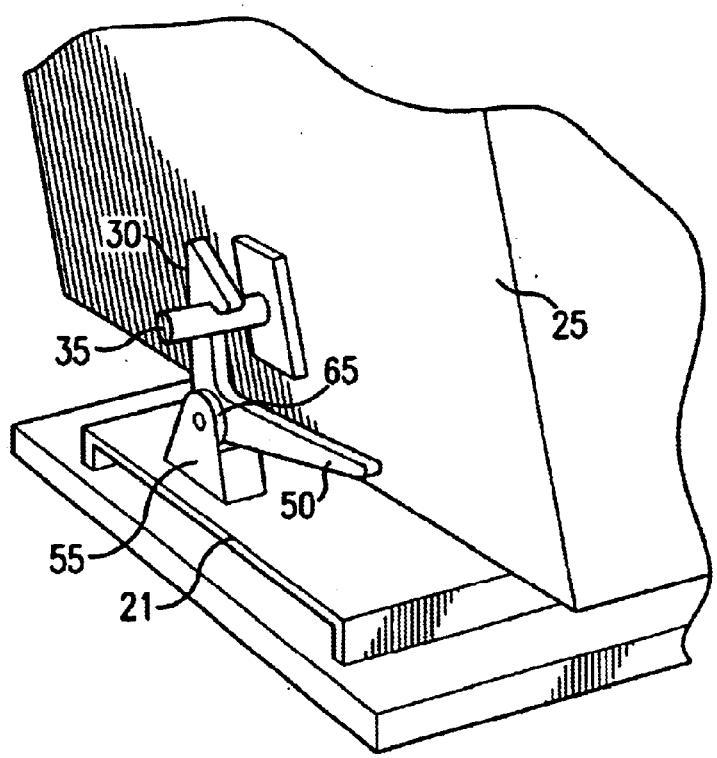
FIG. 2 is a close-up side perspective view of the prior art latch mechanism of FIG. 1 in a latched position.
Figure 3:
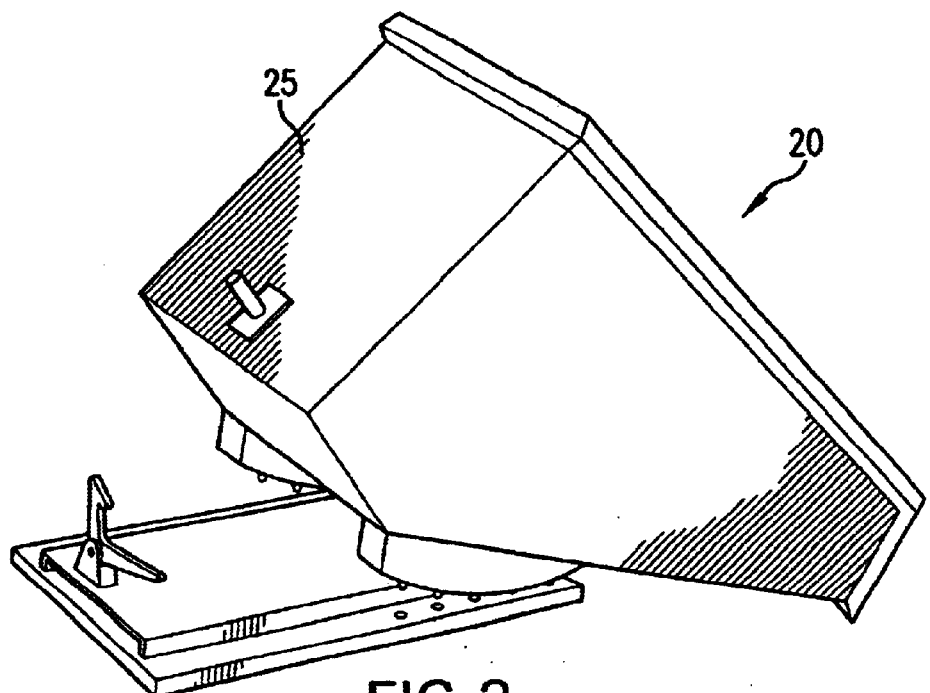
FIG. 3 is a side perspective view of the prior art hopper shown in FIG. 1 in a dumping position.

FIGS. 1–3 show a prior art hopper system having a standard latching system. FIGS. 4–7A show a similar prior art hopper equipped with a counter latch system according to one embodiment of this invention. The hopper system includes fork pocket 21 in base 27 for access from a pair of forks from a forklift which is used to transport and elevate the hopper 20 to a container for dumping. During the loading, transport and elevation for dumping the hopper 20 is locked to the base 27 by means of its latching mechanism, which consists of the latching pin 35 mounted on the hopper body 25, the latching hook 30 integral with its trip lever release handle 50 mounted on the hopper base pocket 21 by means of the hook and handle pivot bracket 55, and the hook and handle return spring 65 also mounted on the pivot bracket 55. During dumping, gravity maintains the hopper 20 on a gear-like track 22 that cooperates with trunion pins 23 in the hopper, causing the hopper to both dump and move forward in synchronization. This causes the center of gravity of the hopper 20 to move even further forward to accelerate the dumping action.

With the forklift mast fully tilted rearward, and the center of gravity of the hopper 20 in this position biased rearward or balanced, the dumping process of the hopper 20 is initiated manually by a person on the ground lifting the trip lever release handle 50 to release the hopper latching hook 30 from the latching pin 35. In the prior art hopper system, shown in FIGS. 1–3, the trip lever release handle 50 must typically be kept manually in the raised position, or else, if released, the counter torque of its return spring 65 will relatch the hopper 20 and prevent the dumping operation. Equipping the prior art hopper system, FIGS. 1–3, with a counter latch system according to this invention and deploying the counter latch system obviates the necessity to manually keep the hopper trip lever handle in the raised position. This permits the hopper dumping process to proceed as a one-person operation.

Figure 4:
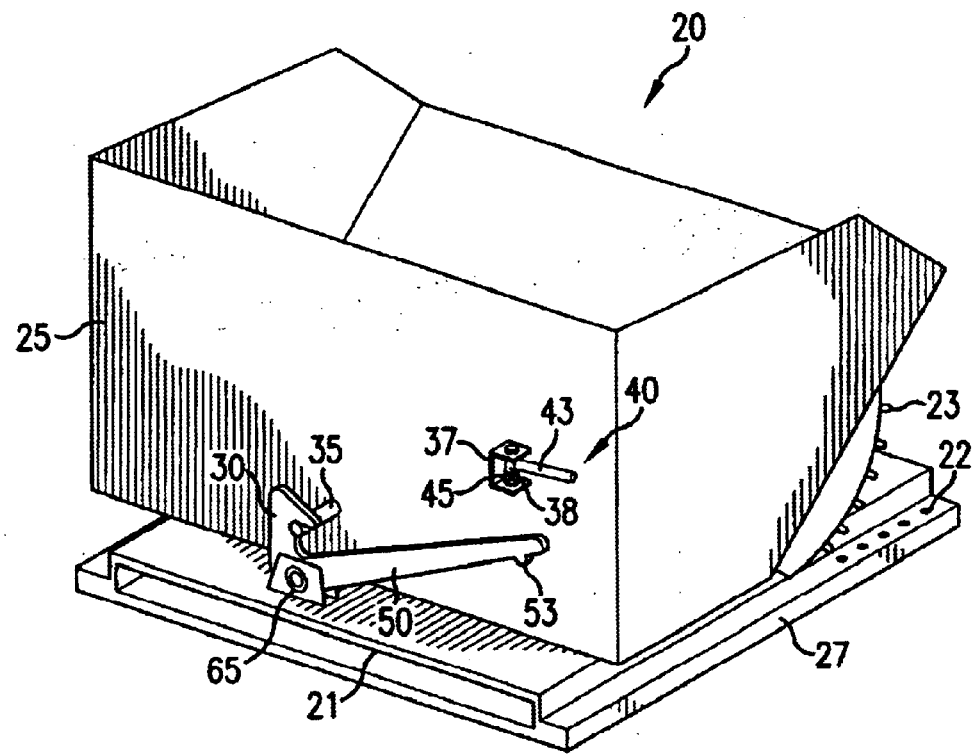
FIG. 4 is a front perspective view of a hopper in a latched position with a counter latch system according to one preferred embodiment of this invention.
Figure 6:
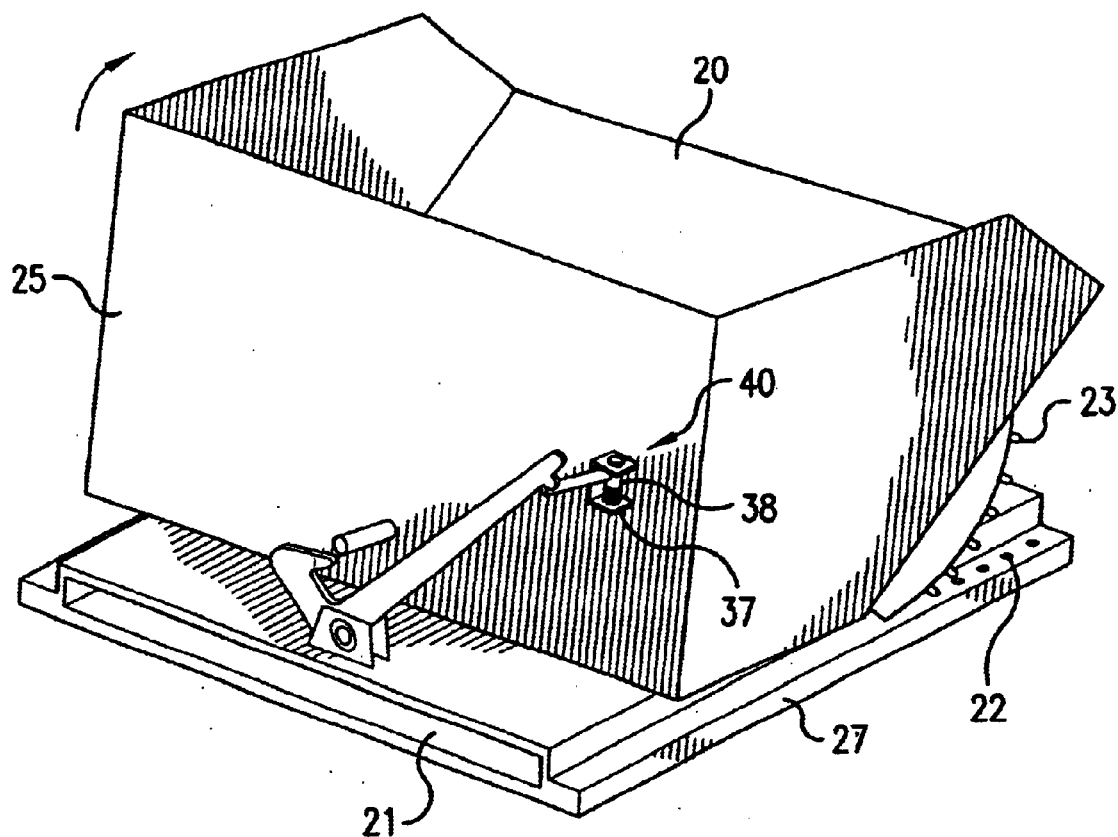
FIG. 6 is a front perspective view of the hopper shown in FIG. 4 in an unlatched position with the deployed counter latch system at the beginning of the hopper dump.
Figure 6A:
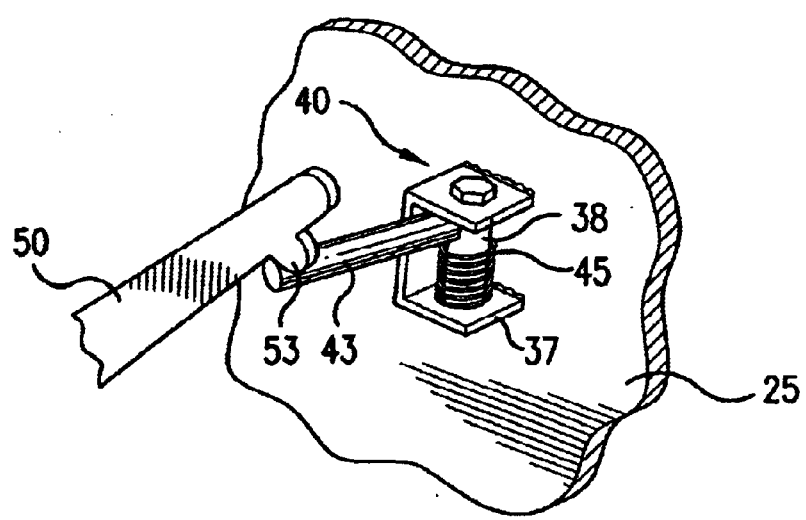
FIG. 6A is a close-up front view of a portion of the deployed counter latch system shown in FIG. 6.
Figure 7:
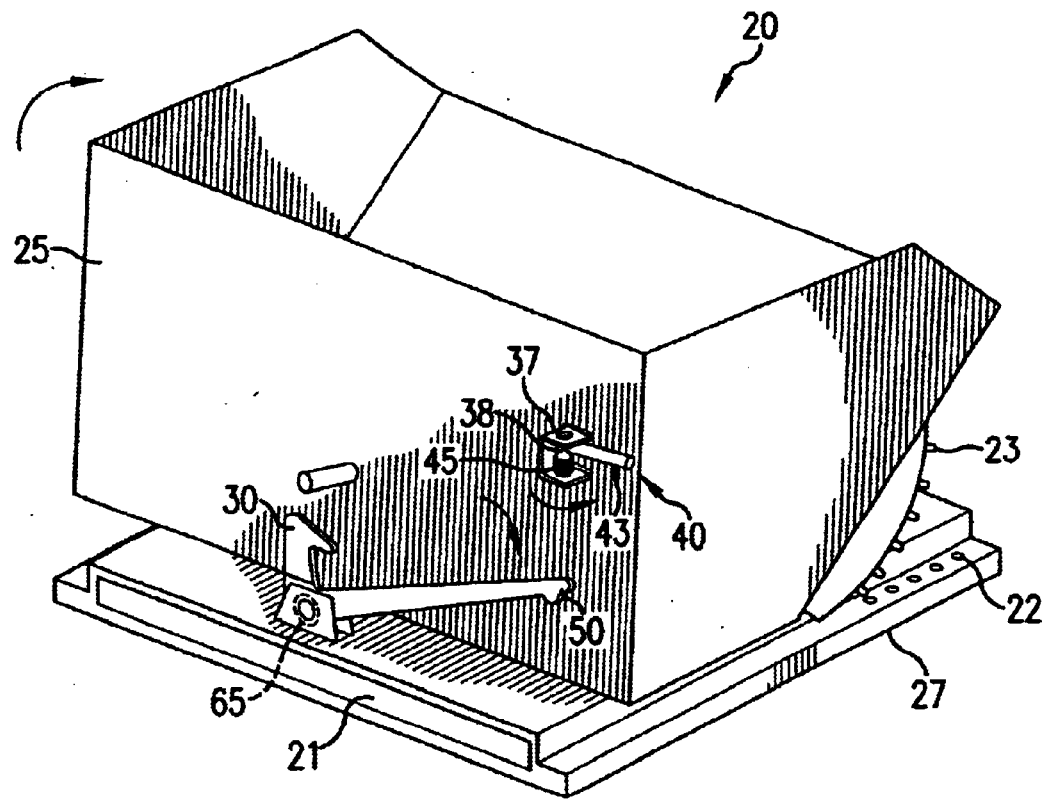
FIG. 7 is a front perspective view of the hopper shown in FIG. 4 in a dumping position showing the counter latch retracted.
Figure 7A:
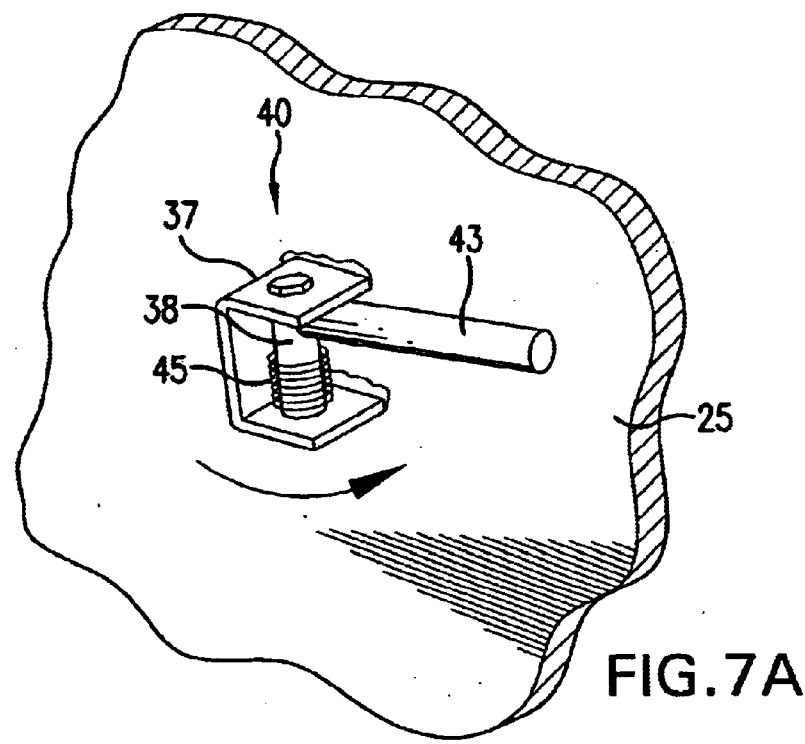
FIG. 7A is a close-up front view of a portion of the counter latch system shown in FIG. 7.

FIGS. 4–7A show a counter latch system according to one embodiment of this invention, in its various stages of operation, equipping the prior art hopper system of FIGS. 1–3. FIG. 4 shows the counter latch system 40, comprising a counter latch system bracket 37, a pivot shaft 38 mounted in the bracket 37, a blocking member or blocking rod 43 rigidly attached to the pivot shaft 38 and thus capable of pivoting by means of this shaft, and the rod return spring 45, which returns the blocking rod 43 from its deployed state away from the hopper rear wall 25, FIGS. 5–6A, to its undeployed state against the hopper rear wall 25, FIG. 4 and FIGS. 7–7A.

Figure 5:
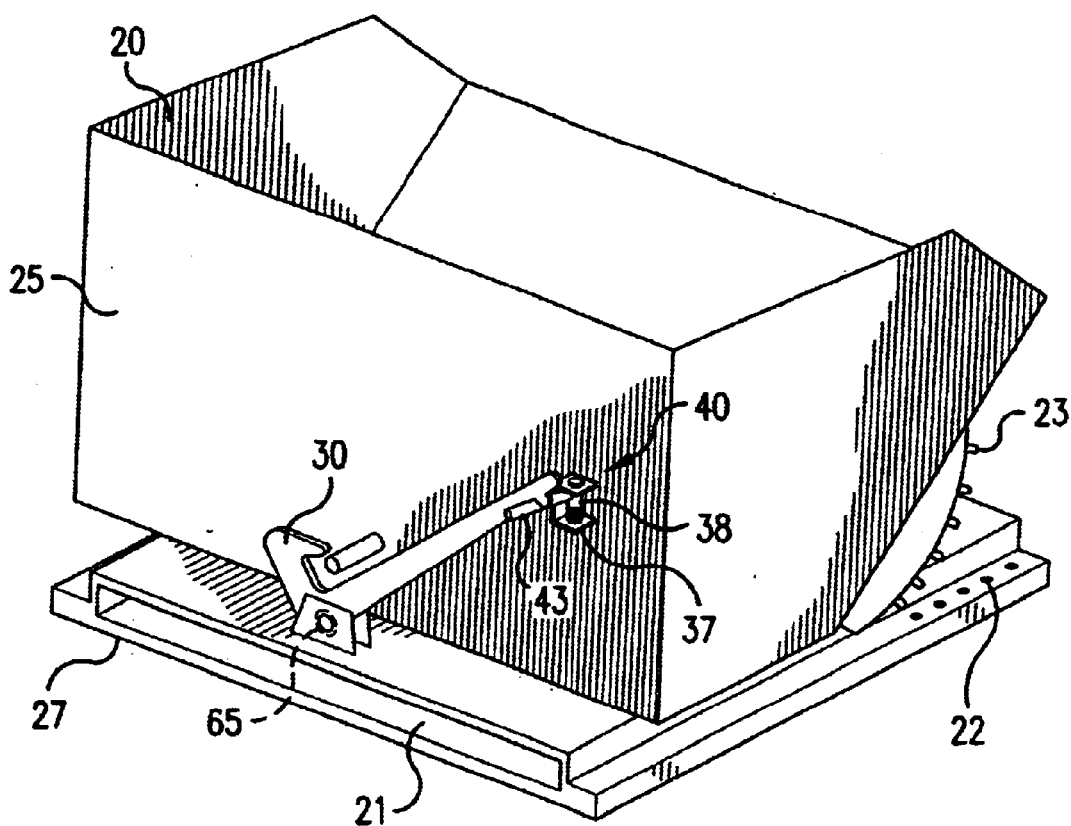
FIG. 5 is a front perspective view of the hopper shown in FIG. 4 in an unlatched position and the counter latch deployed during rearward bias of the hopper.
Figure 5A:
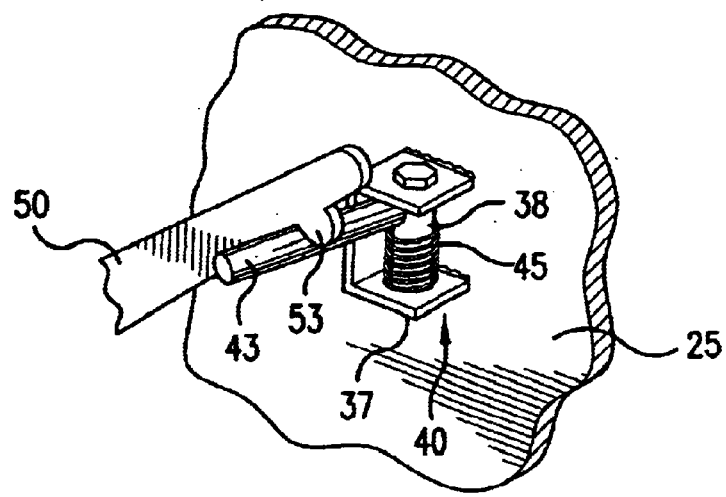
FIG. 5A is a close-up front view of a portion of the deployed counter latch system shown in FIG. 5.

The counter latch system 40 is preferably attached to the rear hopper panel 25 by means of the counter latch system bracket 37. The bracket 37 is strategically oriented and located on panel 25, such that when the counter latch blocking member 43, or rod 43, is deployed into the return path of the raised hopper release handle 50, FIGS. 5–5A, it blocks the handle 50 from returning to its hopper latching mode. If necessary, the handle 50 may be equipped with a detent 53 as shown in the figures, in order to prevent the spring 45 to force the blocking rod 43 to prematurely release the handle 50.

As previously indicated, the dumping process of the hopper 20 is initiated manually by an operator on the ground lifting the trip lever release handle 50 to release a latch, such as the hopper latching hook 30, from the latching pin 35. While holding the handle 50 lifted with one hand the operator deploys the blocking rod 43 of the counter latch system under the handle 50 with the other hand to the blocking position shown in FIGS. 5–5A. Now, the same operator can climb the forklift, lift the hopper system into the elevated dumping position over a dumpster and tilt the forklift mast forward to cause the hopper 20 to dump its load.

As the hopper 20 in its dumping motion moves forward along its track 22, the rear wall 25 of the hopper, together with its attached counter latch system 40 also move forward. FIGS. 5–7A show that this movement will pull the blocking rod 43 of the counter latch 40 from under the handle 50. When this happens, the handle 50 is returned by its return spring 65 to its hopper relatching position, and the blocking rod 43 of the counter latch 40 is returned by its return spring 45 to its undeployed state against the hopper rear wall 25, FIGS. 7–7A. This outcome permits the return of the empty hopper to its latched and locked position after dumping by the same process as used by prior art hoppers. Note that the release and return process of the handle 50 and the blocking rod 43 is completely automatic requiring no manual input.

As described in more detail below, the counter latch system 40 of this invention may be configured and mounted to the self dumping hopper system in any number of ways. As was shown in FIGS. 4–7A and will be shown in FIGS. 8–19A, various embodiments of the counter latch system 40 are mounted on the hopper 20 rear panel 25. Alternately, as shown in FIGS. 20–23A, the components of an embodiment of the counter latch system 40 may be mounted on both the hopper base 27 and the hopper 20 rear panel 25. Or, as shown in FIGS. 24–27A, the components of an embodiment of the counter latch system 40 may be mounted on both the hopper 20 latch release handle 50 and the hopper 20 rear panel 25.

Additional preferred embodiments as shown in the figures are described below. Each of these embodiments require a self dumping hopper wherein latch 30 is maintained in an unlatched position by counter latch system 40 after hopper 20 is unlatched, generally in a rearward tilt position, and thereafter counter latch system 40 and latch 30 are permitted to return to their original positions after hopper 20 moves forward toward the dumping position.

Hopper Rear Panel-mounted Counter Latch

The counter latch system embodiment 40 shown in FIGS. 4–7A belongs to this category. The counter latch system, and its operation, have been described previously in great detail.

Figure 8:
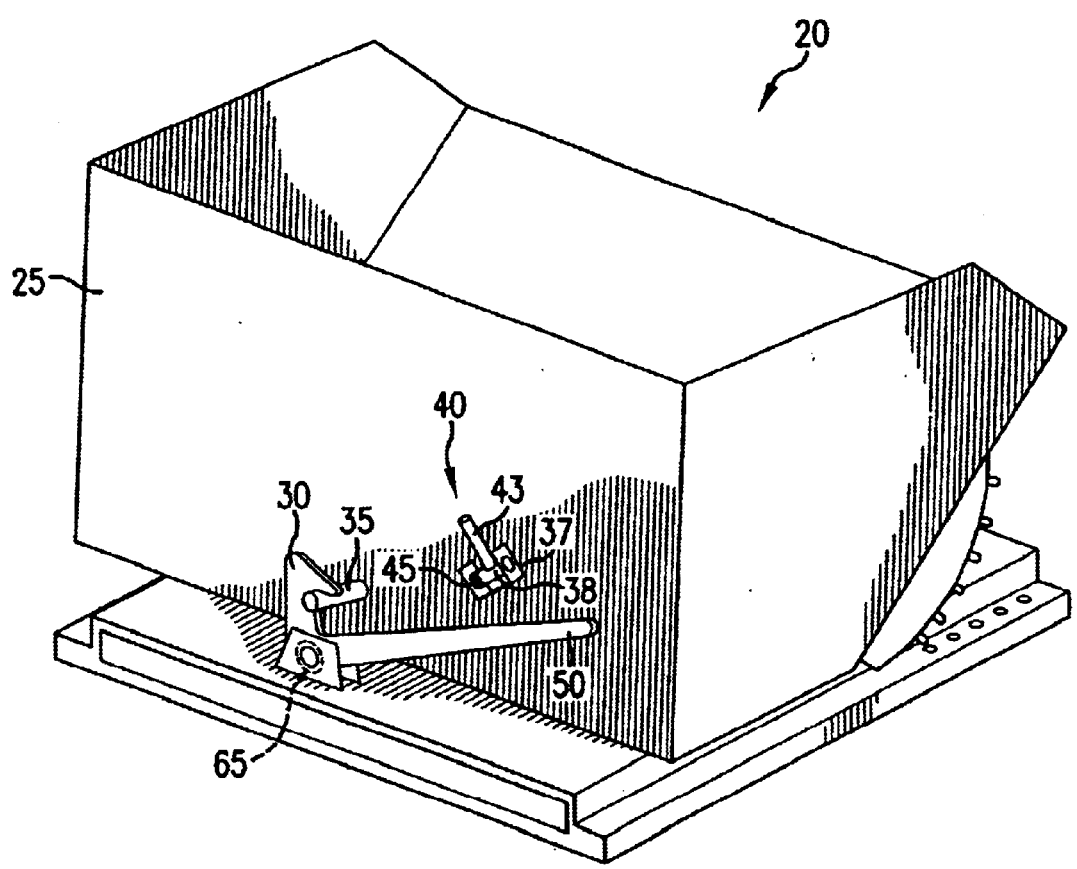
FIG. 8 is a front perspective view of a hopper in a latched position and a retracted counter latch system according to one preferred embodiment of this invention.
Figure 9:
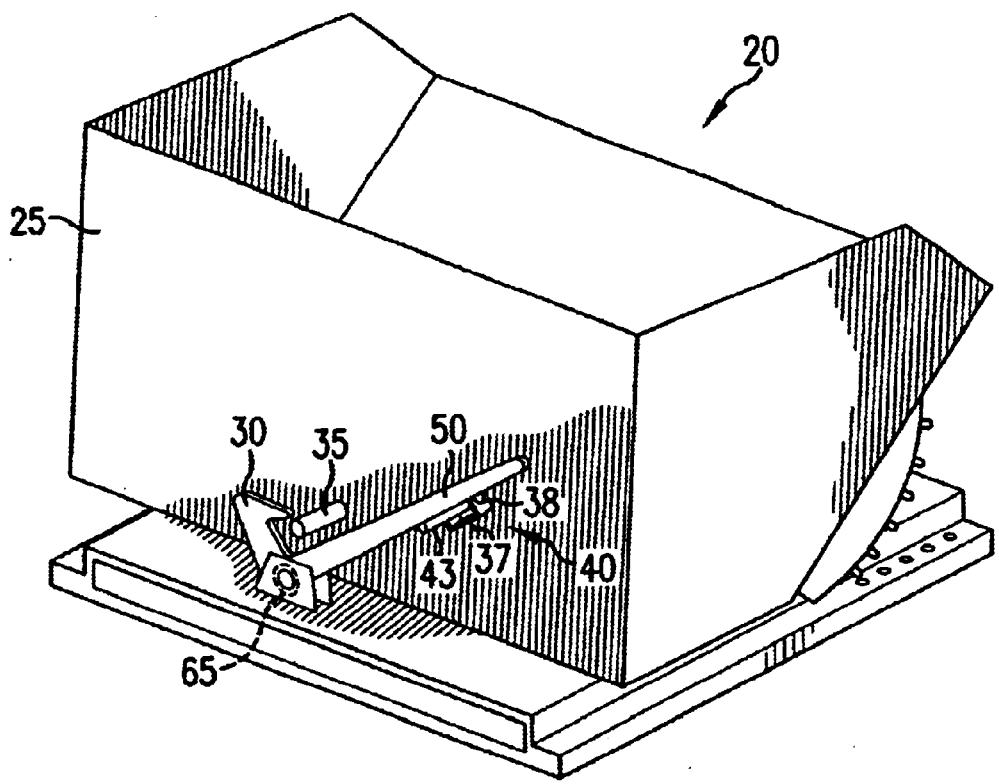
FIG. 9 is a front perspective view of the hopper shown in FIG. 8 in an unlatched position and the counter latch deployed.
Figure 9A:
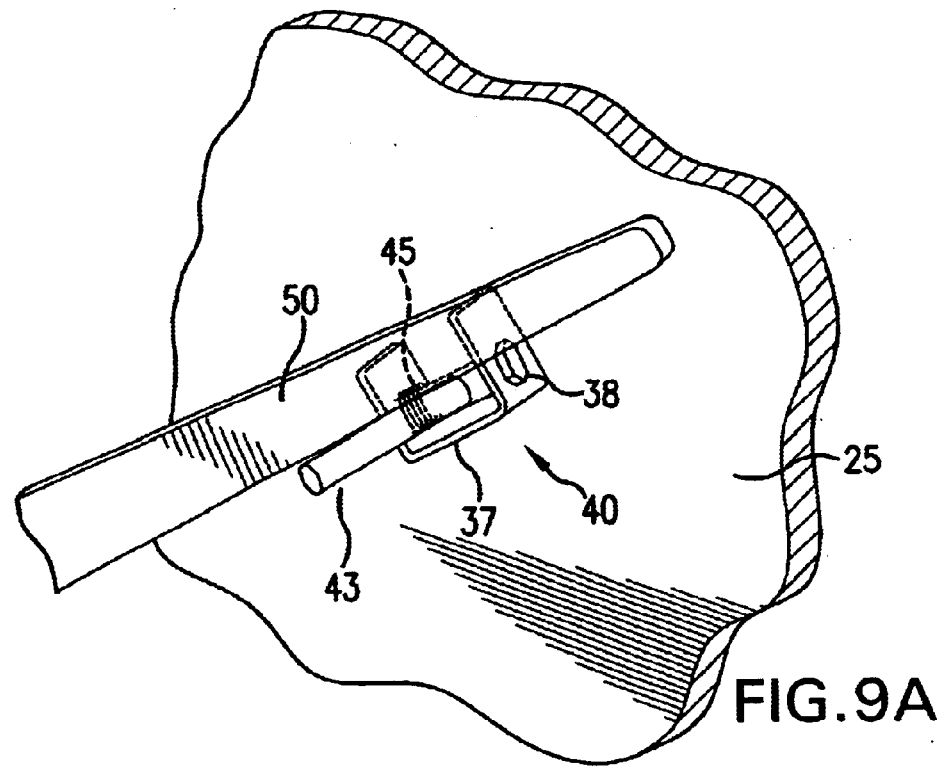
FIG. 9A is a close-up front view of the deployed counter latch system shown in FIG. 9.

The counter latch system embodiment 40 shown in FIGS. 8–9A is a variant of that shown in FIG. 4. The components and operation of the counter latch system 40 are generally the same as described for the counter latch system 40 shown in FIGS. 4–7A except that the detent 53 on hopper handle 50 is no longer needed. This is achieved by changing the mounting orientation of the counter latch bracket 37 on the hopper rear panel 25. The new mounting orientation is such that, when the counter latch blocking rod 43 is deployed under the handle 50 into the blocking position as shown in FIGS. 9–9A, a premature release of the handle 50 cannot occur. This eliminates the need of a detent 53 on handle 50 which was present in the counter latch system 40 shown in FIGS. 4–7A. Therefore, there is no such detent shown in FIGS. 8–9A. FIG. 8 shows the counter latch 40 in its undeployed state with the hopper 20 latched and locked prior to dumping. FIGS. 9–9A show the hopper 20 unlatched in readiness for dumping, with the counter latch 40 in its deployed blocking state under the hopper latch release handle 50, to prevent the handle from relatching the hopper 20 before dumping.

Figure 10:
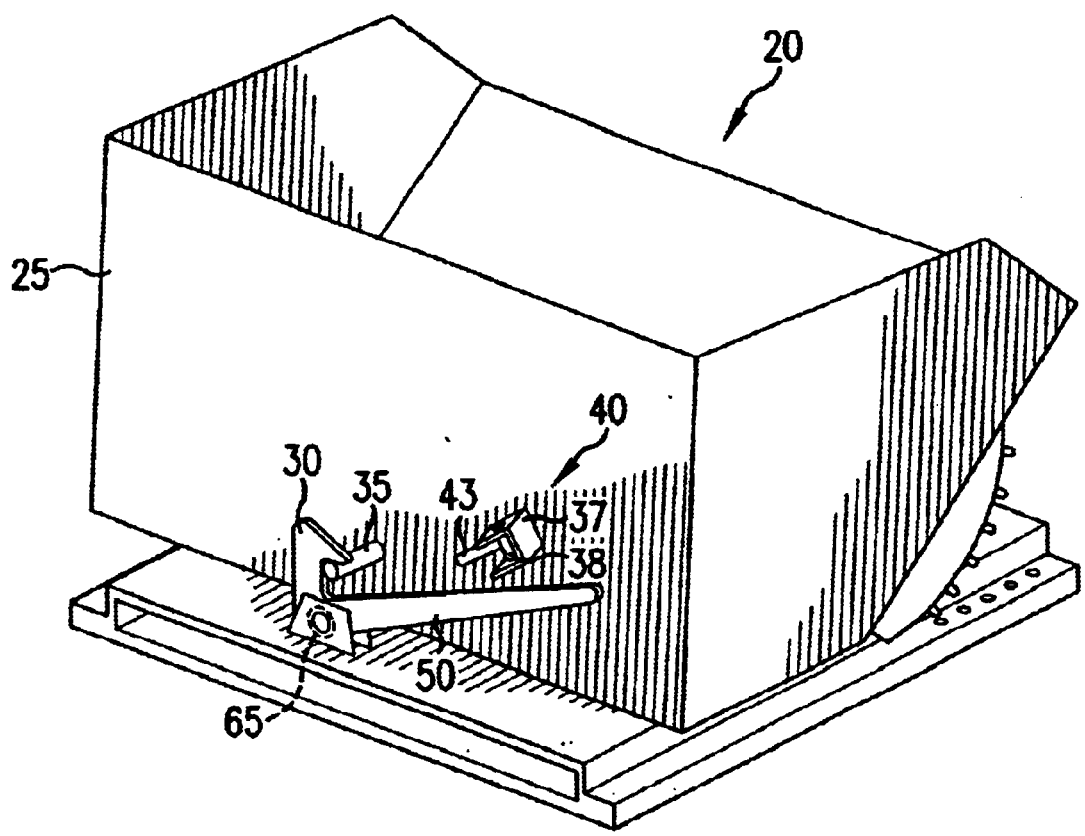
FIG. 10 is a front perspective view of a hopper in a latched position and a retracted counter latch system according to one preferred embodiment of this invention.
Figure 11:
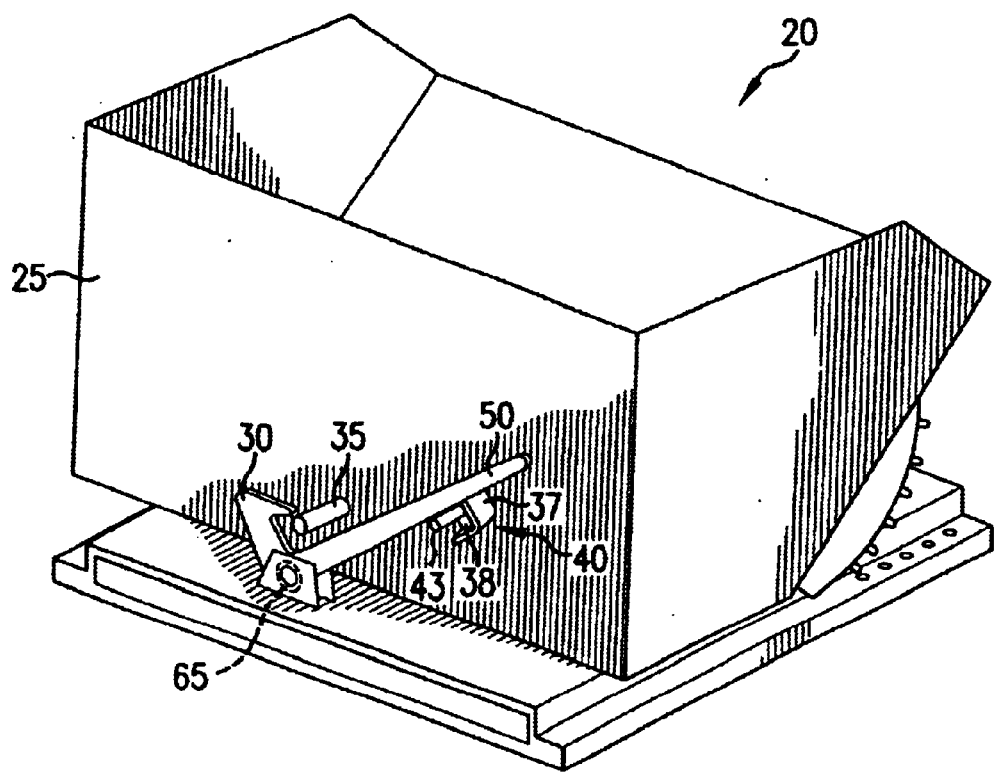
FIG. 11 is a front perspective view of the hopper shown in FIG. 10 in an unlatched position and the counter latch deployed.
Figure 11A:
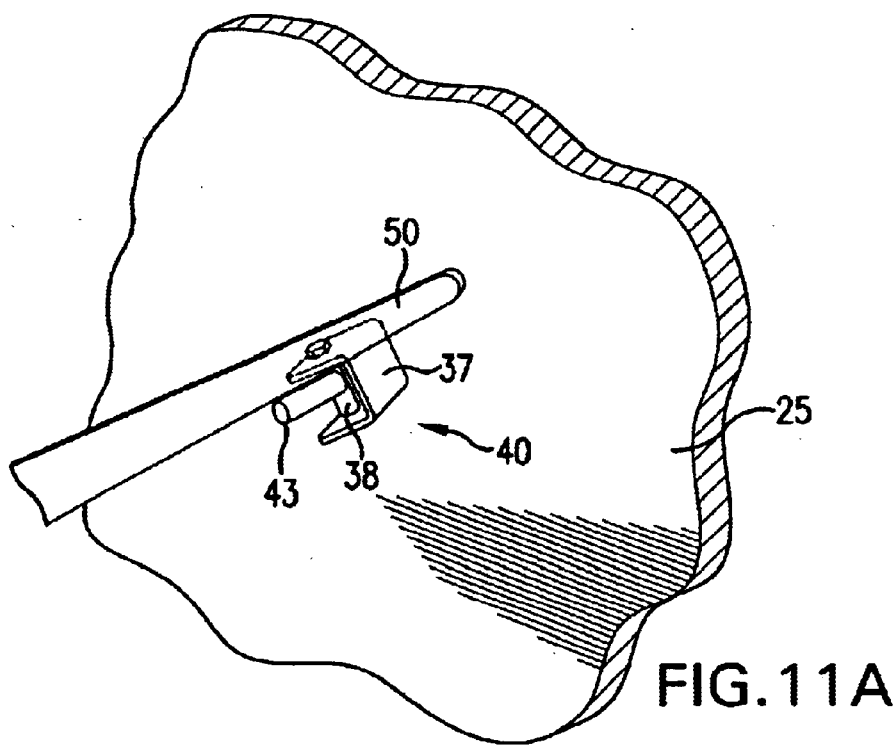
FIG. 11A is a close-up front view of the deployed counter latch system shown in FIG. 11.

The counter latch system embodiment 40 shown in FIGS. 10–11A is a variant of that shown in FIG. 4 and FIG. 8. Here, the rod return spring 45 has been eliminated in addition to the detent 53 on handle 50. All other components and operation of this new embodiment are the same as described for the counter latch system 40 shown FIGS. 4–7A. The difference as compared with FIG. 8, is a change in the mounting orientation of the counter latch bracket 37 on the hopper rear panel 25. The new mounting orientation shown in FIG. 10 is such that, when the counter latch blocking rod 43 returns from its deployed state under the raised handle 50, FIGS. 11–11A, to its undeployed state against the hopper panel 25, FIG. 10, it does so by the force of gravity acting on the blocking rod 43 when the hopper dumping motion pulls the blocking rod 43 from under the handle 50. This eliminates the need for a counter latch rod return spring 45 present in the counter latch system 40 shown in FIGS. 8–9A. Therefore, there is no such spring shown in FIGS. 10–11A. FIG. 10 shows the counter latch 40 in its undeployed state with the hopper 20 latched and locked prior to dumping. FIGS. 11–11A show the hopper 20 unlatched in readiness for dumping, with the counter latch 40 in its deployed blocking state under the hopper latch release handle 50, to prevent the handle from relatching the hopper 20 before dumping.

Figure 12:
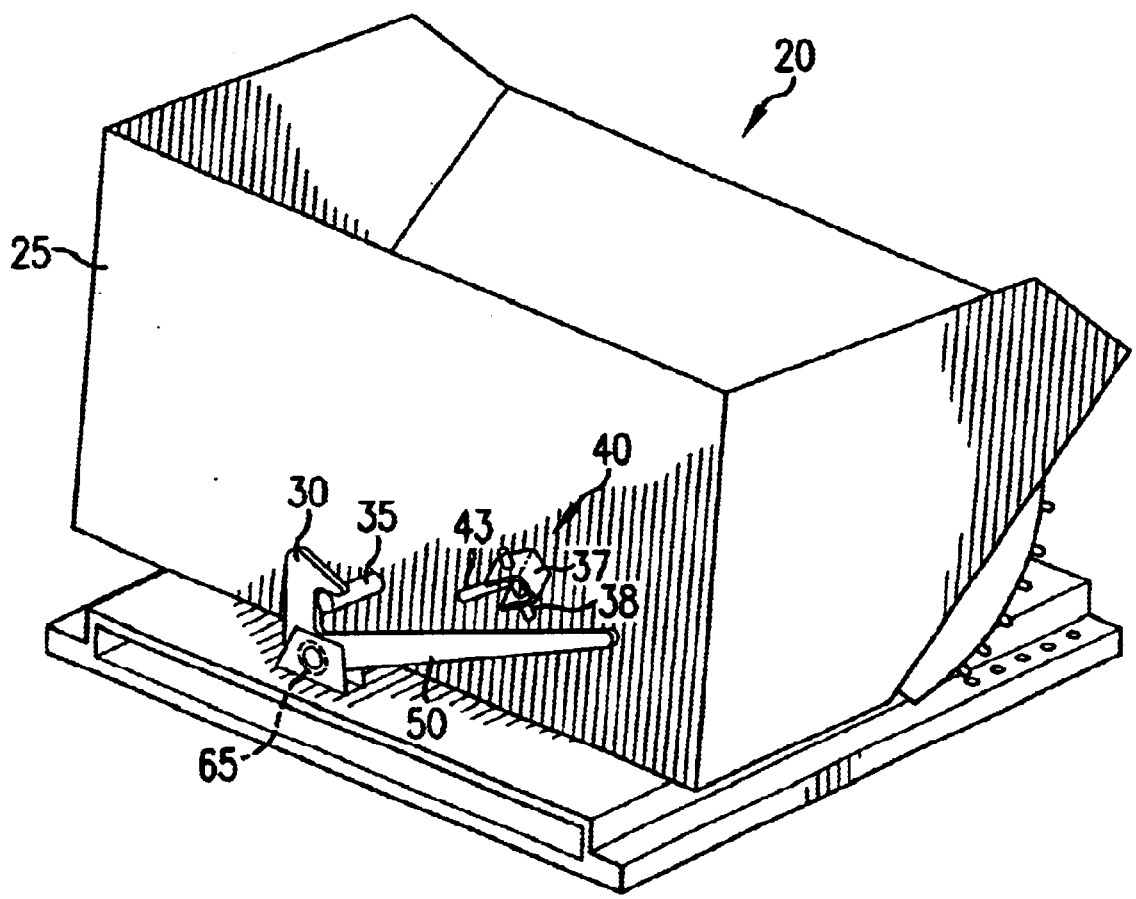
FIG. 12 is a front perspective view of a hopper in a latched position and a retracted counter latch system according to one preferred embodiment of this invention.
Figure 13:
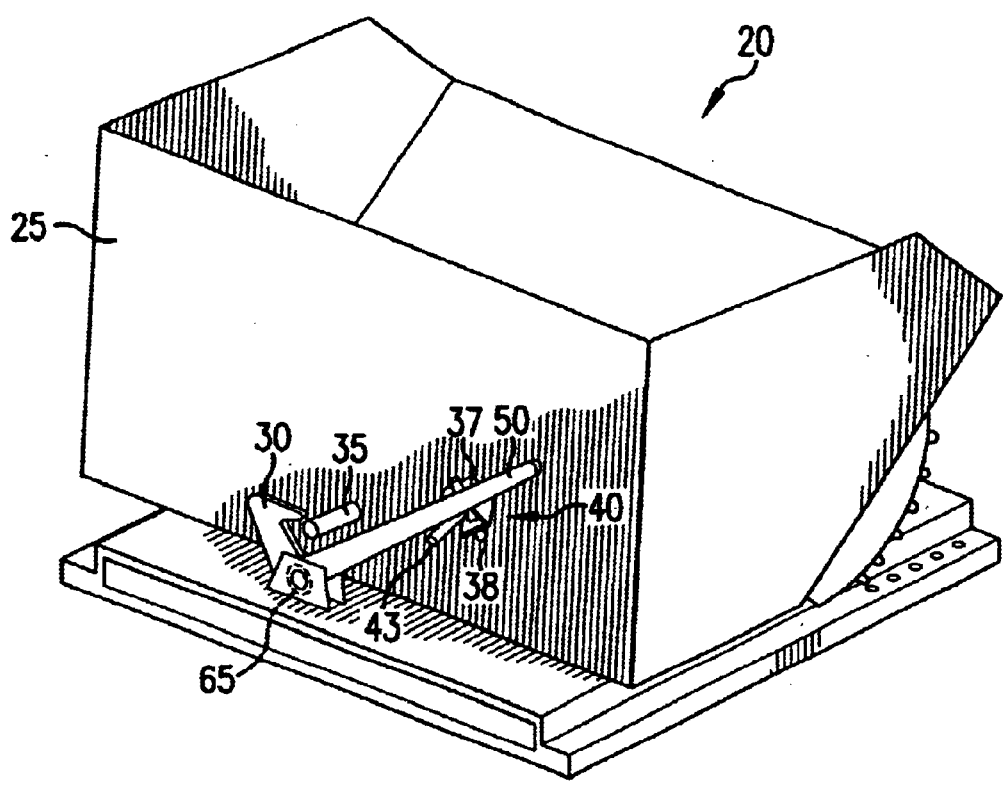
FIG. 13 is a front perspective view of the hopper shown in FIG. 12 in an unlatched position and the counter latch deployed.
Figure 13A:
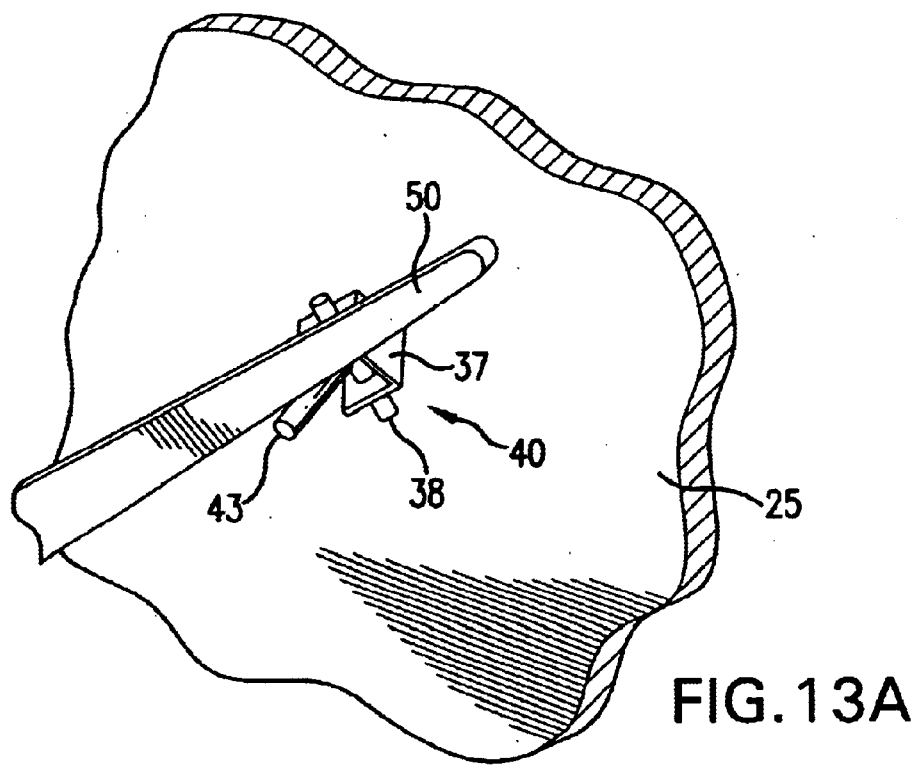
FIG. 13A is a close-up front view of the deployed counter latch system shown in FIG. 13.

The counter latch system embodiment 40 shown in FIGS. 12–13A is a variant of that shown in FIG. 4 and FIG. 10. Here, the pivot shaft 38 of the rod 43 is mounted in the bracket 37 in an angled orientation relative to the surface of the hopper rear panel 25, whereas in FIG. 10 the pivot shaft 38 was parallel to the surface of the hopper rear panel 25. In this new orientation, the lower end of the shaft 38 is farther away from the panel 25 surface than the upper end of the shaft. All other components and operation of this new embodiment are generally the same as described for the counter latch system 40 shown FIGS. 4–7A. This change in the pivot shaft 38 orientation increases the gravitational return force acting on the counter latch blocking rod 43 as compared with that of the counter latch system embodiment 40 shown in FIGS. 10–11A. FIG. 12 shows the counter latch 40 in its undeployed state with the hopper 20 latched and locked prior to dumping. FIGS. 13–13A show the hopper 20 unlatched in readiness for dumping, with the counter latch 40 in its deployed blocking state under the hopper latch release handle 50, to prevent the handle from relatching the hopper 20 before dumping.

Figure 14:
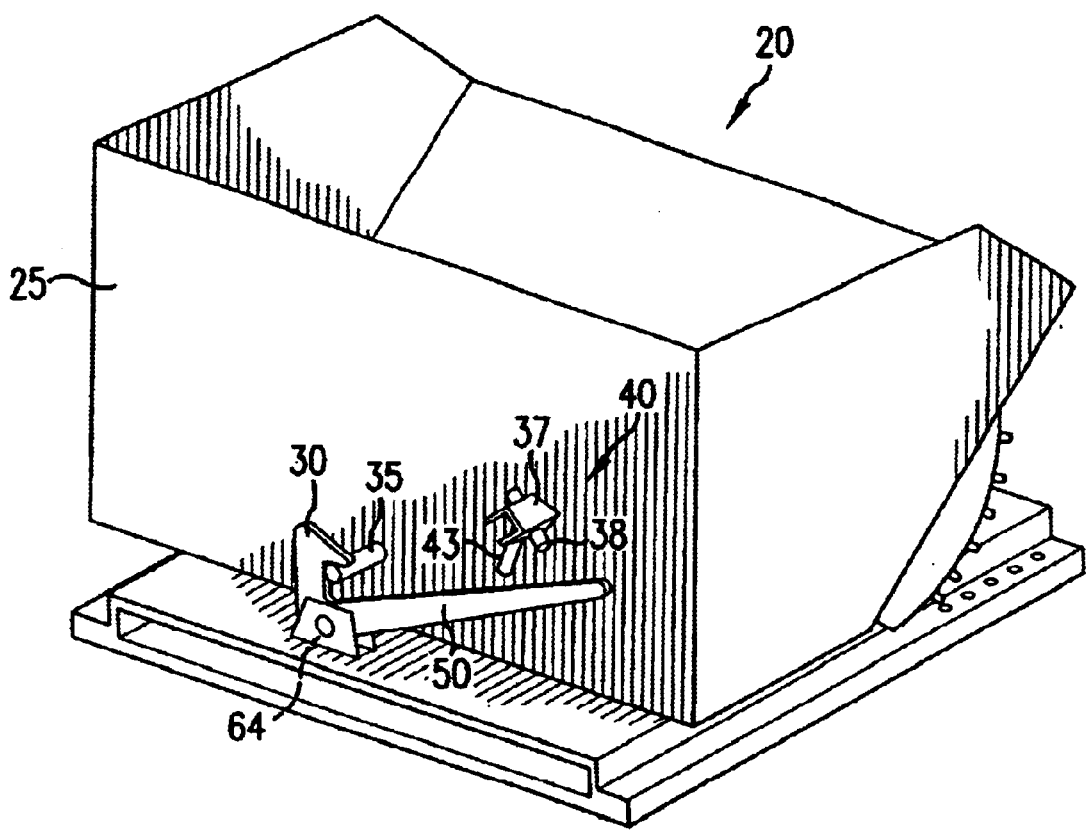
FIG. 14 is a front perspective view of a hopper in a latched position and a retracted counter latch system according to one preferred embodiment of this invention.
Figure 15:
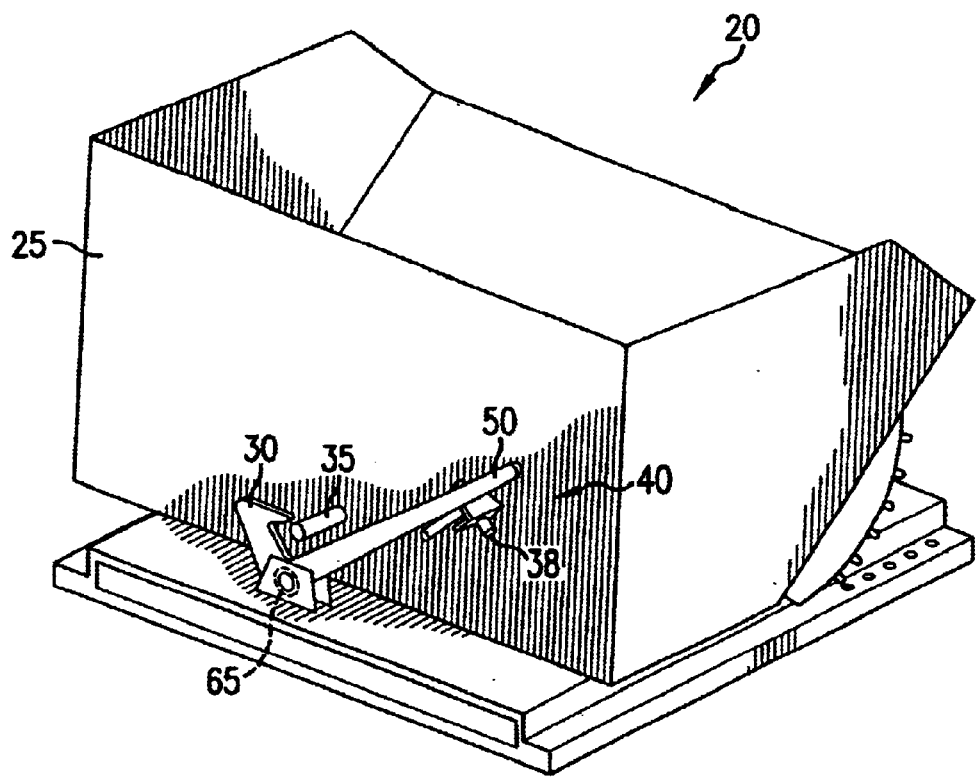
FIG. 15 is a front perspective view of the hopper shown in FIG. 14 in an unlatched position and the counter latch deployed.
Figure 15A:
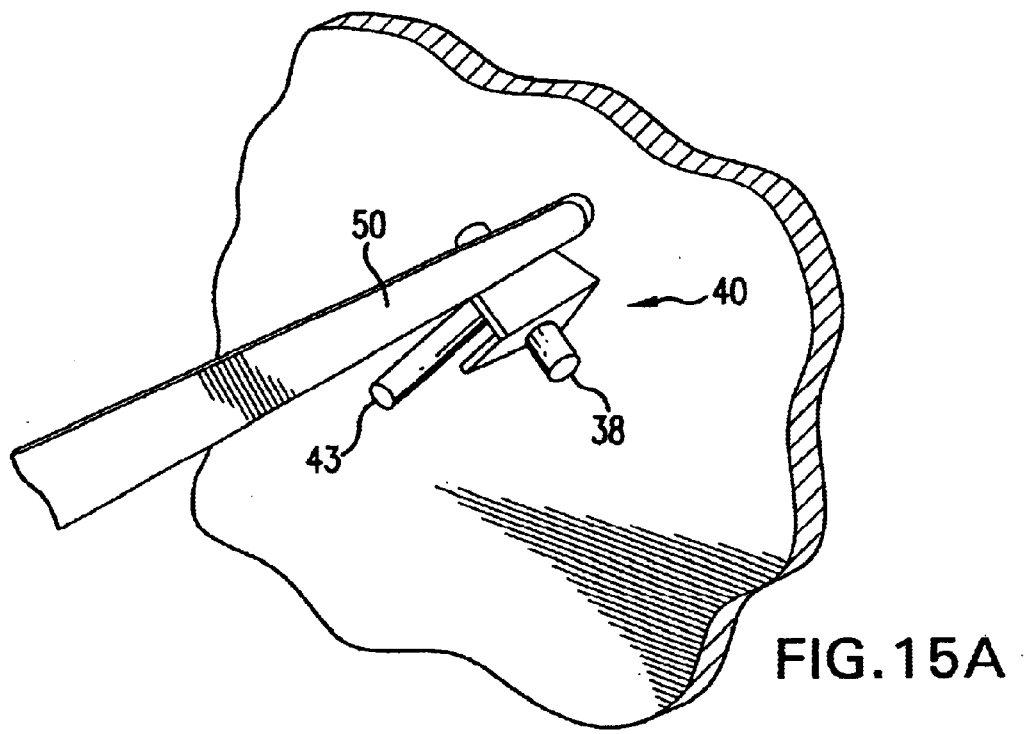
FIG. 15A is a close-up front view of the deployed counter latch system shown in FIG. 15.

The counter latch system embodiment 40 shown in FIGS. 14–15A is a variant of that shown in FIG. 4 and FIG. 12. Here, the angled orientation of the pivot shaft 38 of the rod 43 relative to the surface of the hopper rear panel 25 is achieved by angling the mounting surface of bracket 37 in contact with the rear panel 25 as shown in FIGS. 14–15A. All other components and operation of this new embodiment are generally the same as for the counter latch system 40 shown FIGS. 12–13A. FIG. 14 shows the counter latch 40 in its undeployed state with the hopper 20 latched and locked prior to dumping. FIGS. 15–15A show the hopper 20 unlatched in readiness for dumping, with the counter latch 40 in its deployed blocking state under the hopper latch release handle 50, to prevent the handle from relatching the hopper 20 before dumping.

Figure 16:
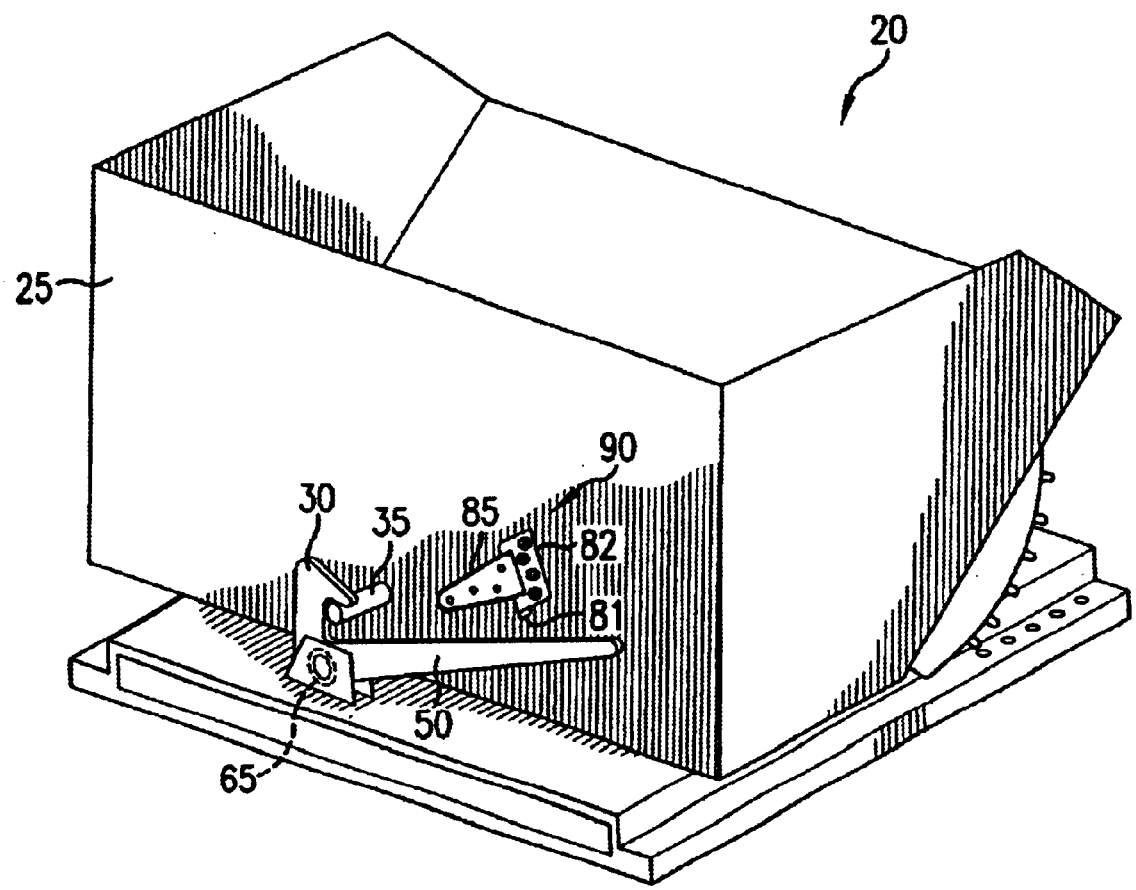
FIG. 16 is a front perspective view of a hopper in a latched position and a retracted counter latch system according to one preferred embodiment of this invention.
Figure 17:
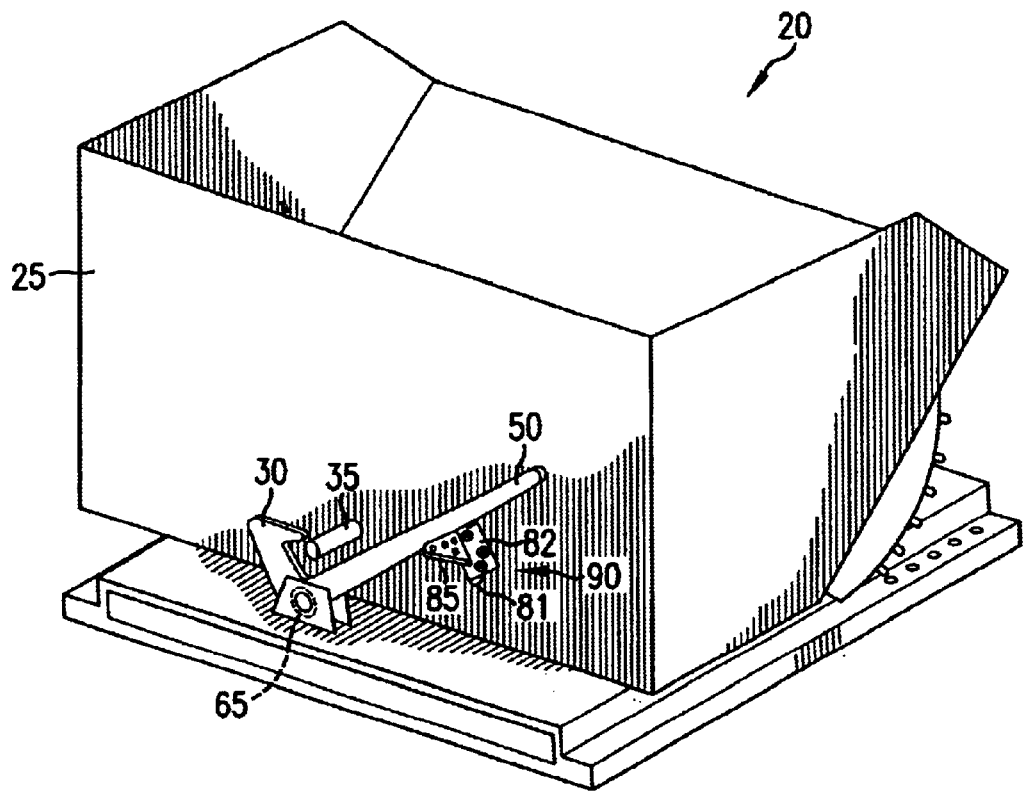
FIG. 17 is a front perspective view of the hopper shown in FIG. 16 in an unlatched position and the counter latch deployed.
Figure 17A:
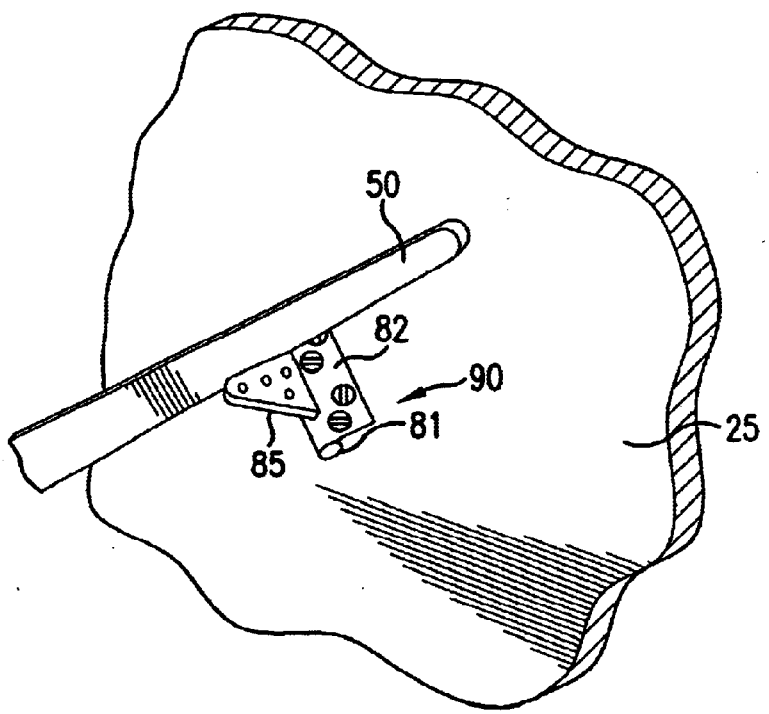
FIG. 17A is a close-up front view of the deployed counter latch system shown in FIG. 17.

The counter latch system embodiment shown in FIGS. 16–17A is a variant of that of FIG. 10, the springless detentless counter latch system. Here, the whole counter latch system 40 of FIG. 10 has been replaced with a counter latch system 90 consisting of a commercial hinge, which likely costs less than fabricating a counter latch system such as 40. The operation of the counter latch system embodiment 90 is the same as for the counter latch system 40 shown in FIGS. 10–11A. FIG. 16 shows the counter latch 90 in its undeployed state with the hopper 20 latched and locked prior to dumping. FIGS. 17–17A show the hopper 20 unlatched in readiness for dumping, with the counter latch 90 in its deployed blocking state under the hopper latch release handle 50, to prevent the handle from relatching the hopper 20 before dumping.

The counter latch system 90 of FIGS. 16–17A is typically attached to the rear hopper panel 25 by means of the hinge leaf 82 using screws through the existing holes in leaf 82. The leaf 82 is attached to panel 25 with the hinge pin hoops 81 in contact with, and laying flat against, the surface of the panel 25. This mode of attachment permits the counter latch blocking member, the hinge leaf 85, to open only about 90 degrees away from the panel 25 when deployed as the blocking member under the hopper handle 50. This obviates the need of having a detent on handle 50 to prevent the hinge leaf 85 from releasing the handle 50 by opening too much. The attachment orientation of leaf 82 on panel 25 is selected so as to cause the counter latch blocking member, the hinge leaf 85, to return from its deployed state under the raised handle 50, FIGS. 17–17A, to its undeployed state against the hopper panel 25, FIG. 16, by the force of gravity acting on the leaf 85 when the hopper dumping motion pulls the blocking leaf 85 from under the handle 50.

Figure 18:
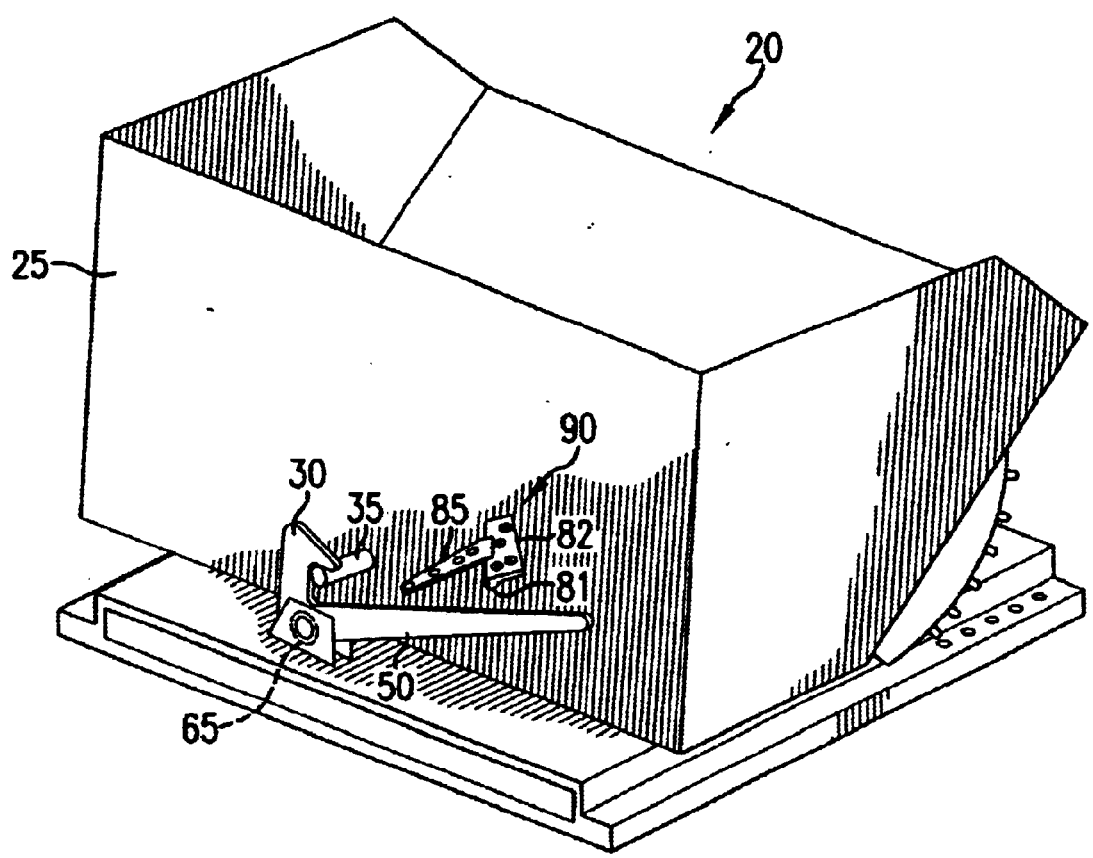
FIG. 18 is a front perspective view of a hopper in a latched position and a retracted counter latch system according to one preferred embodiment of this invention.
Figure 19:
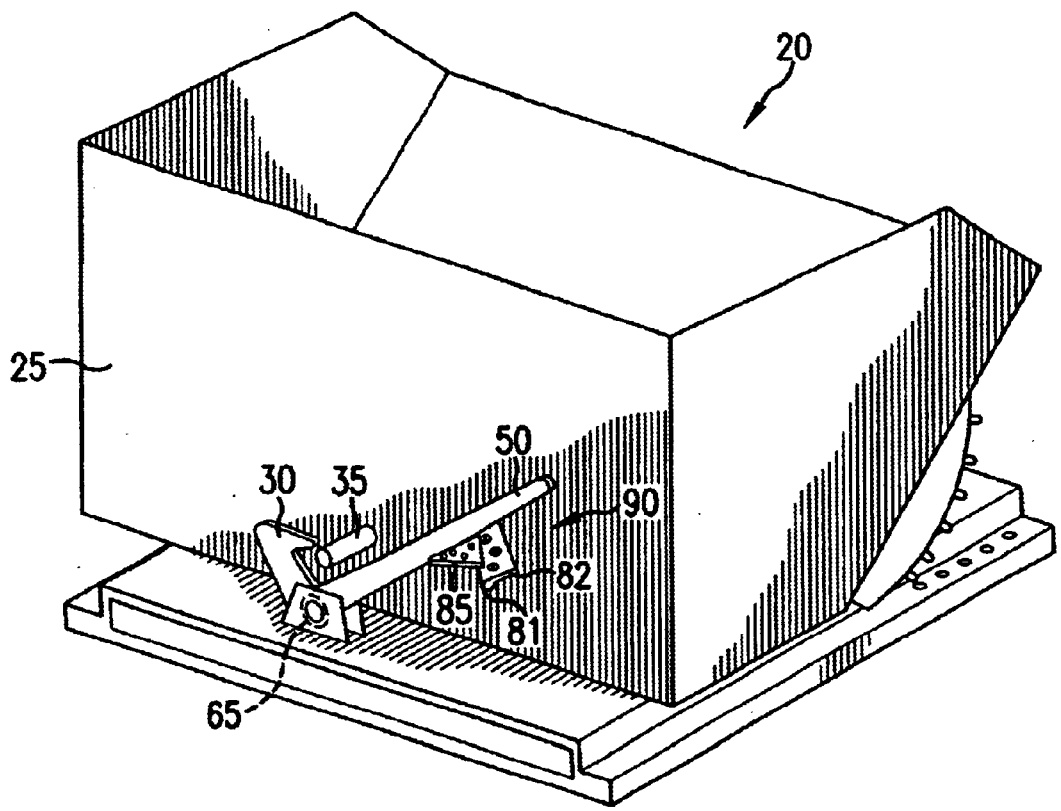
FIG. 19 is a front perspective view of a hopper in an unlatched position and a deployed counter latch system according to one preferred embodiment of this invention.
Figure 19A:
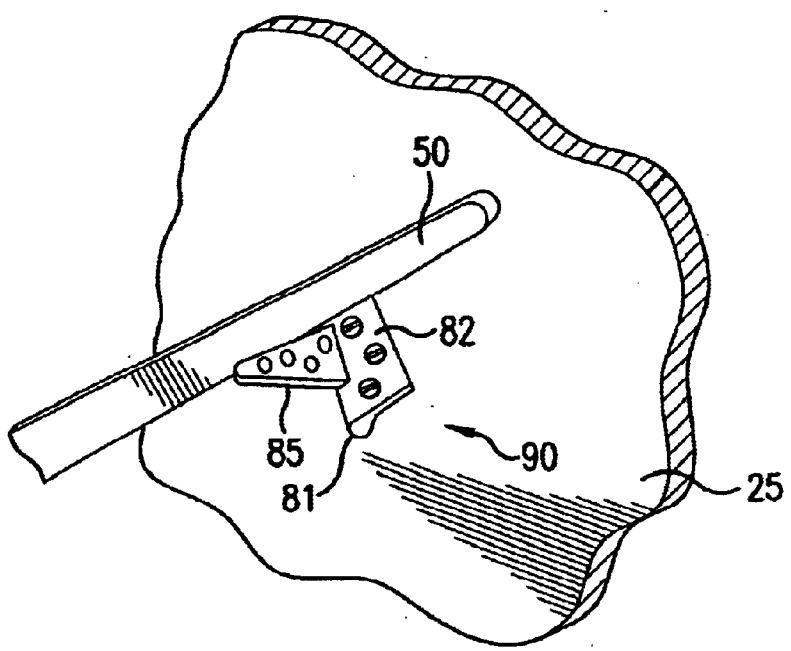
FIG. 19A is a close-up front view of the deployed counter latch system shown in FIG. 19.

The counter latch system embodiment 90 shown in FIGS. 18–19A is a variant of that of FIG. 16. It has an enhanced gravitational return force acting on the counter latch blocking member 85. To achieve the enhancement, the hinge leaf 82 has been attached to the rear hopper panel 25 such that lower end of the hinge pin hoops 81 seen in the figures is raised away from the rear hopper panel 25 while the upper end of the hinge pin hoops 81 is not. This change of the hinge pin hoops 81 orientation increases the gravitational return force acting on the counter latch blocking member, hinge leaf 85, as compared with that of the counter latch system embodiment 90 shown in FIGS. 16–17A. The operation of this new counter latch system embodiment is the same as for the counter latch system 90 shown in FIGS. 16–17A. FIG. 18 shows the counter latch 90 in its undeployed state with the hopper 20 latched and locked prior to dumping. FIGS. 19–19A show the hopper 20 unlatched in readiness for dumping, with the counter latch 90 in its deployed blocking state under the hopper latch release handle 50, to prevent the handle from relatching the hopper 20 before dumping.

Hopper Base-mounted Counter Latch

FIGS. 20–23A show a hopper base mounted counter latch system, according to one embodiment of this invention, in its various stages of operation. The counter latch system 40, consists of the counter latch system bracket 71 mounted on the hopper base 27 as shown, a pivot shaft 72 mounted pivotally in the bracket 71, the counter latch blocking prop 70, preferably saddle shaped as shown, rigidly attached to the pivot shaft 72, the blocking prop return spring 73, which returns the prop 70 from its deployed state under the hopper release handle 50, to its undeployed state against the hopper base 27, and the blocking prop release link 80 mounted pivotally on the hopper rear panel 25.

Figure 20:
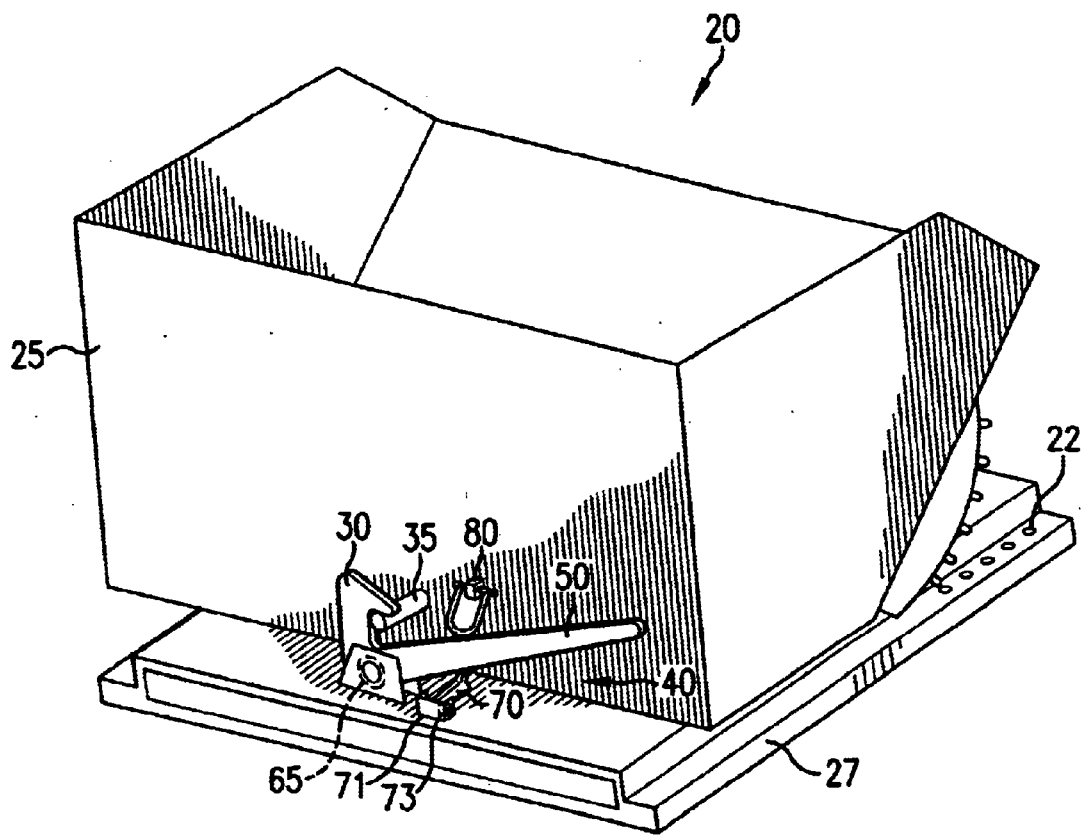
FIG. 20 is a front perspective view of a hopper in a latched position with a counter latch system according to one preferred embodiment of this invention.
Figure 20A:
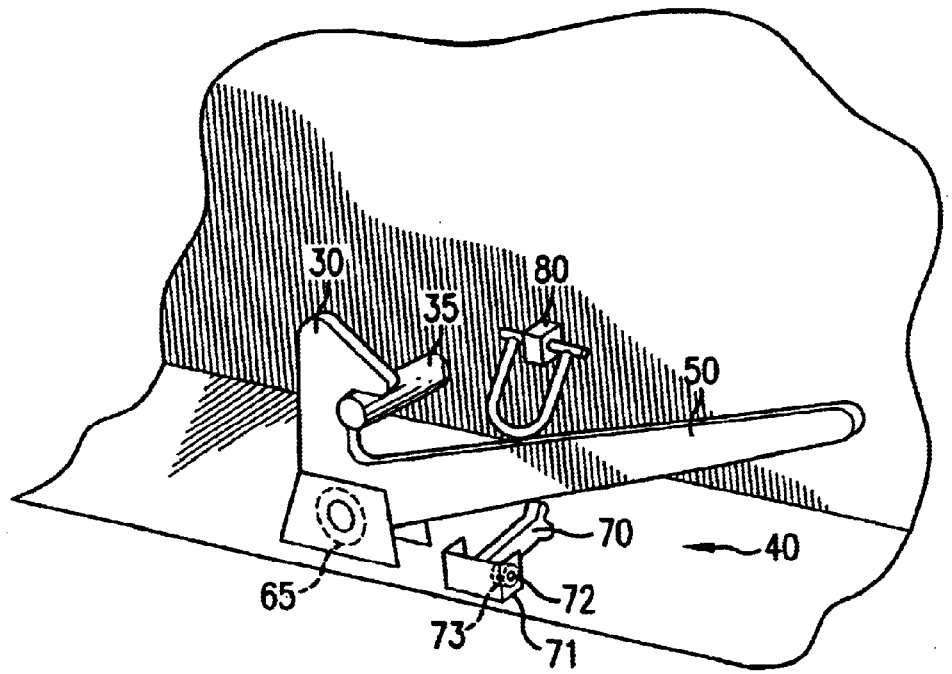
FIG. 20A is a close-up front view of the counter latch and the latching system shown in FIG. 20.
Figure 21:
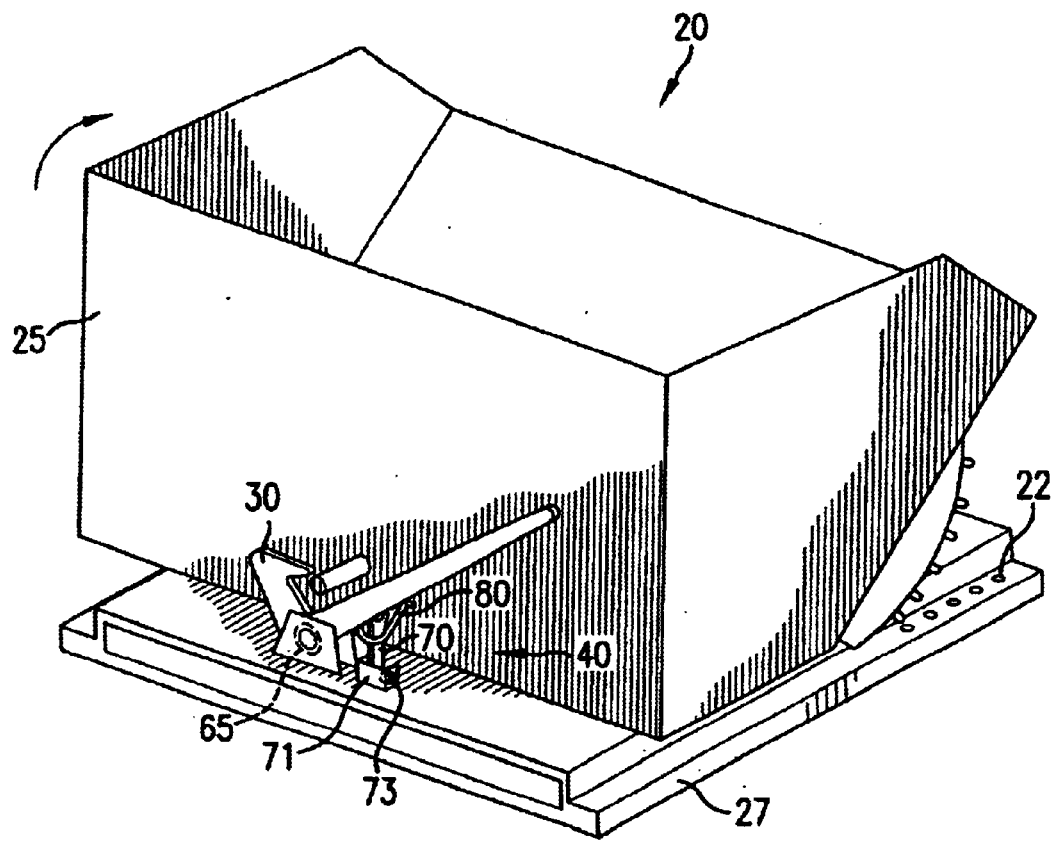
FIG. 21 is a front perspective view of the hopper shown in FIG. 20 in an unlatched position and the counter latch deployed.
Figure 21A:
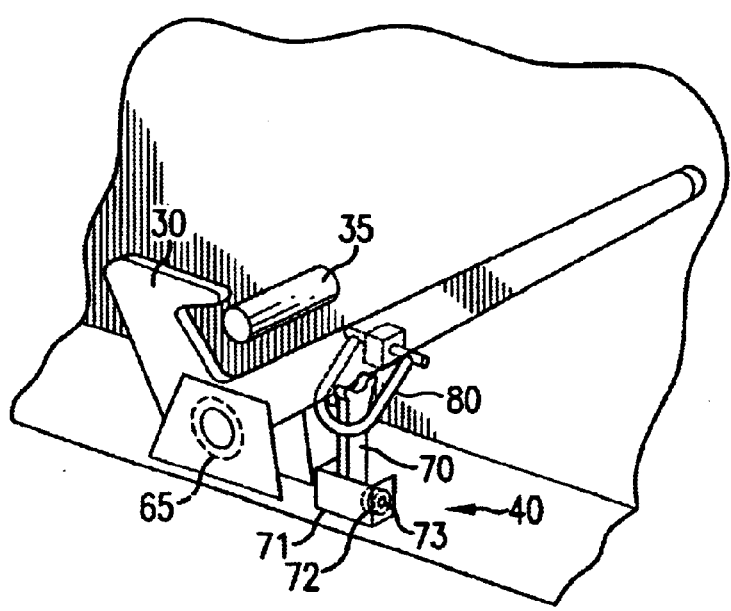
FIG. 21A is a close-up front view of the latching system and the deployed counter latch shown in FIG. 21 during rearward bias of the hopper.

FIG. 20, and its closeup view FIG. 20A, show the latched hopper prior to its dumping initiation mounted on a forklift (not shown) with the forklift mast fully tilted rearward. As previously described, the dumping process of the hopper 20 is initiated manually by an operator on the ground lifting the trip lever release handle 50 to release the latch, specifically a hopper latching hook 30, from the latching pin 35. While holding the handle 50 lifted with one hand, the operator deploys the counter latch blocking prop 70 through the prop release link 80 and under the handle 50 with the other hand, to the blocking position shown in FIGS. 21–21A. The same operator can now climb the forklift, lift the hopper system into the elevated dumping position over a dumpster and tilt the forklift mast forward to cause the hopper 20 to dump its load.

Figure 22:
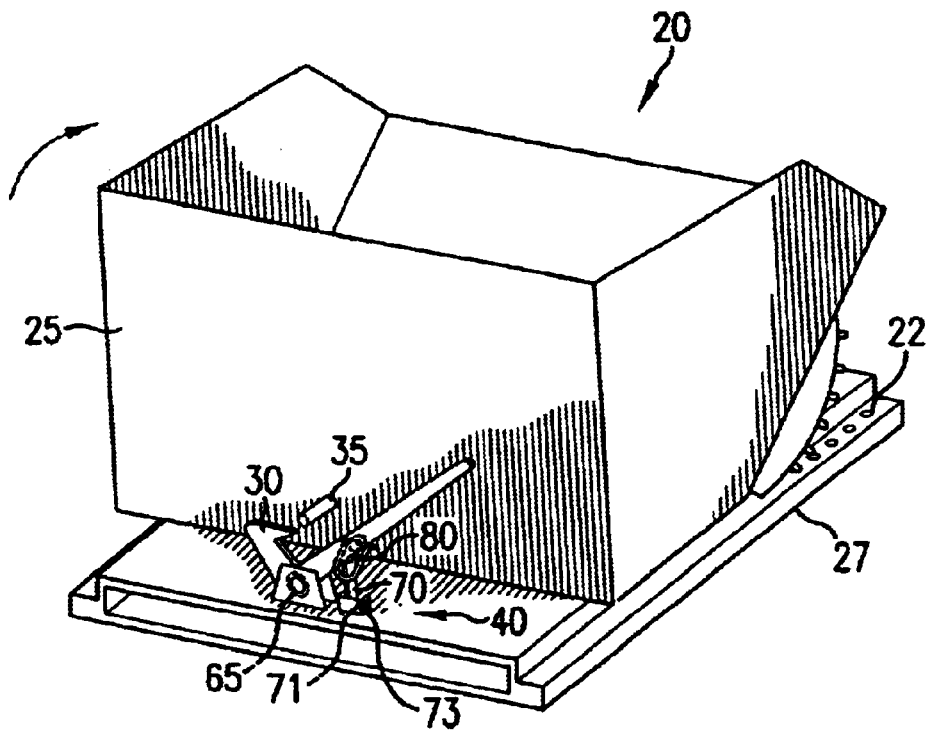
FIG. 22 is a front perspective view of the hopper shown in FIG. 20 in an unlatched position and the counter latch deployed at the beginning of the hopper dump.
Figure 22A:
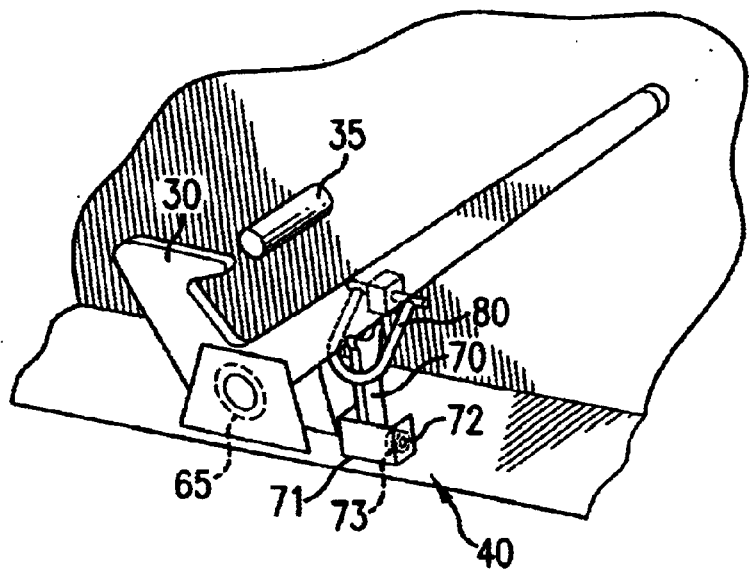
FIG. 22A is a close-up front view of the latching system and the counter latch shown in FIG. 22.
Figure 23:
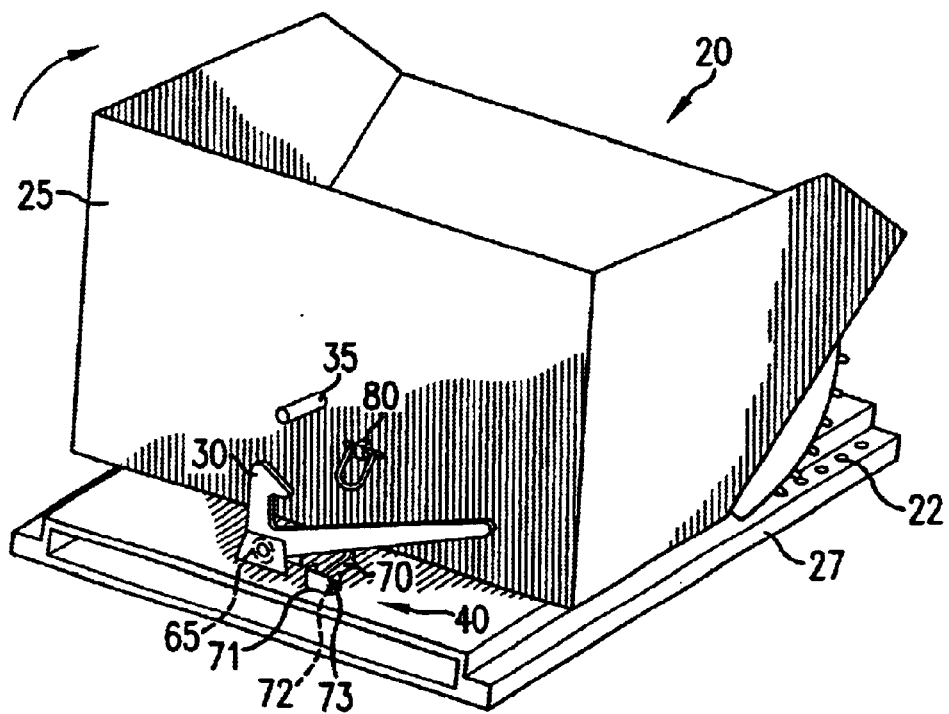
FIG. 23 is a front perspective view of the hopper shown in FIG. 20 in a dumping position and the counter latch disengaged.
Figure 23A:
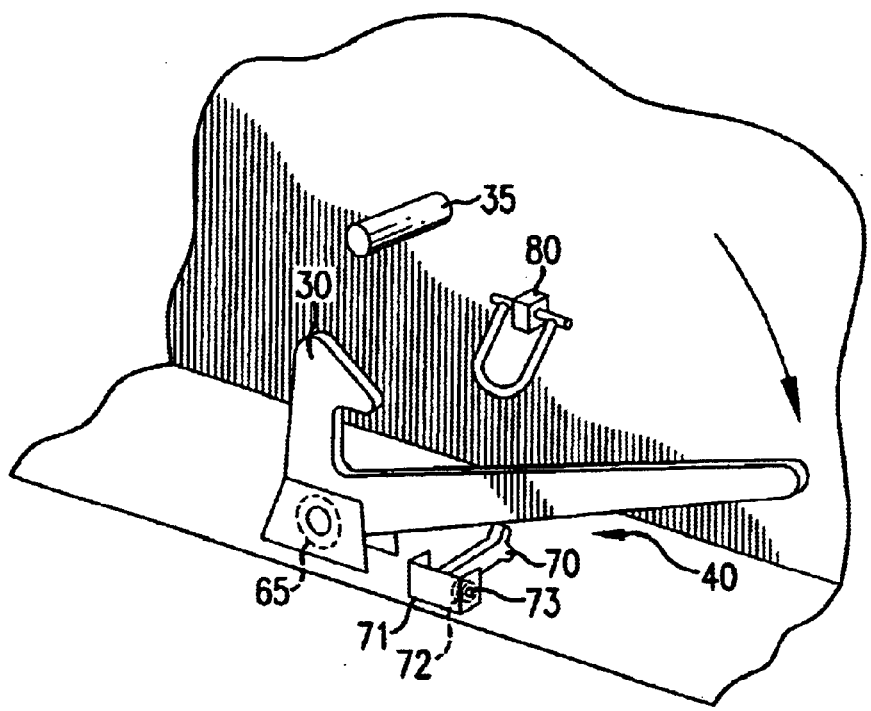
FIG. 23A is a close-up front view of the latching system and the counter latch shown in FIG. 23.

As the hopper 20 in its dumping motion moves forward along its track 22, the rear panel 25 of the hopper, together with its attached blocking prop release link 80 also move forward. FIGS. 22–22A show that this movement of the blocking prop release link 80 will pull the blocking prop 70 from under the handle 50. When this happens, the handle 50 is returned by its return spring 65 to its hopper relatching position, and the blocking prop 70 of the counter latch 40 is returned by its return spring 73 to its undeployed state against the hopper base 27 as shown in FIGS. 23–23A. This outcome permits the return of the empty hopper to its latched and locked position after dumping by the same process as used by prior art hoppers. Note that the release and return process of handle 50 and the blocking prop 70 is completely automatic requiring no manual input.

Hopper Latch Handle-mounted Counter Latch

FIGS. 24–27A show a hopper latch handle mounted counter latch system, according to one embodiment of this invention, in its various stages of operation. The counter latch system 40 preferably comprises the counter latch blocking prop 70 pivotally mounted on the hopper latch handle 50 toward the top of this handle as shown, the blocking prop stop 77, the blocking prop return spring 45, which returns the prop 70 from its deployed state shown in FIGS. 25–25A and FIGS. 26–26A, to its undeployed state against the hopper latch handle 50 shown in FIGS. 27–27A, and the blocking prop cradle 75 mounted on the hopper rear panel 25.

Figure 24:
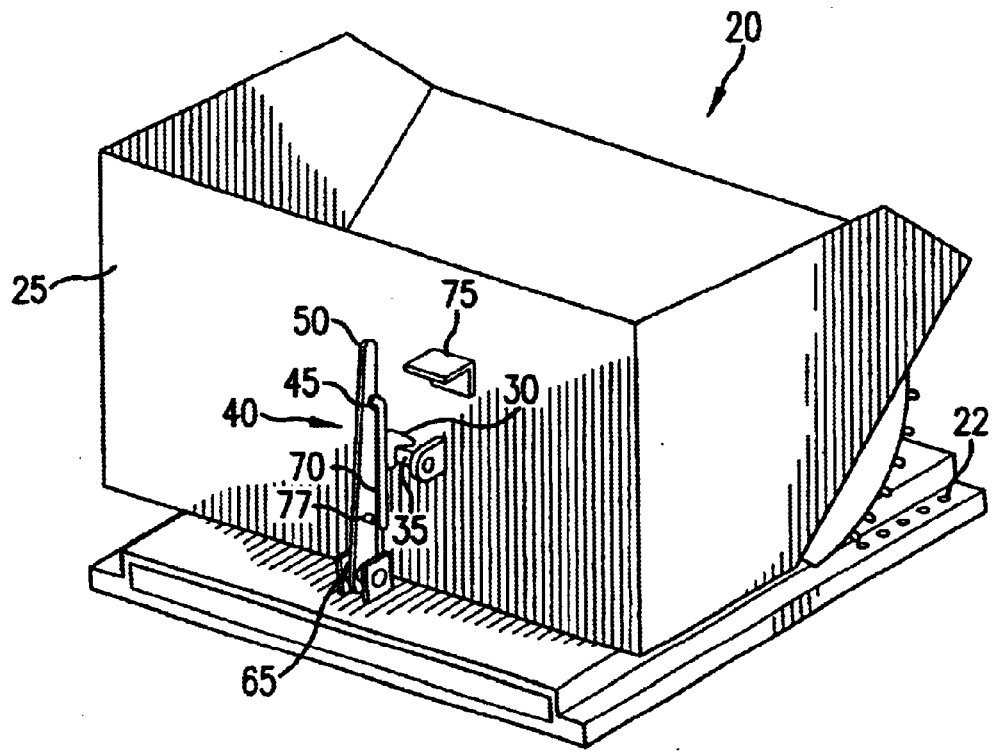
FIG. 24 is a front perspective view of a hopper in a latched position with a counter latch system according to one preferred embodiment of this invention.
Figure 24A:
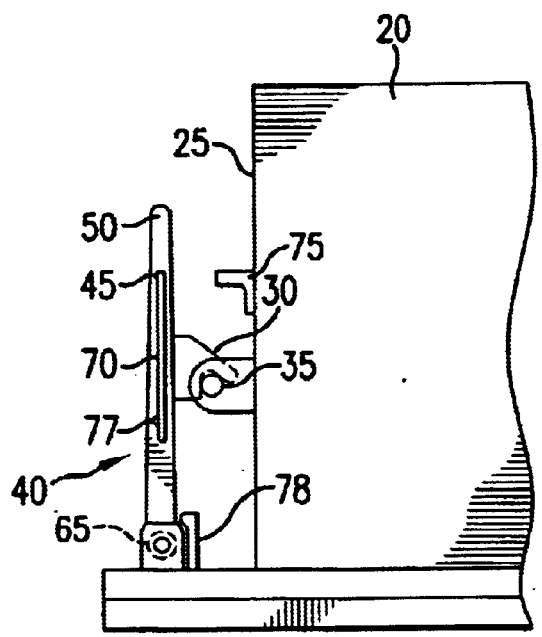
FIG. 24A is a side view of the hopper shown in FIG. 24.
Figure 25:
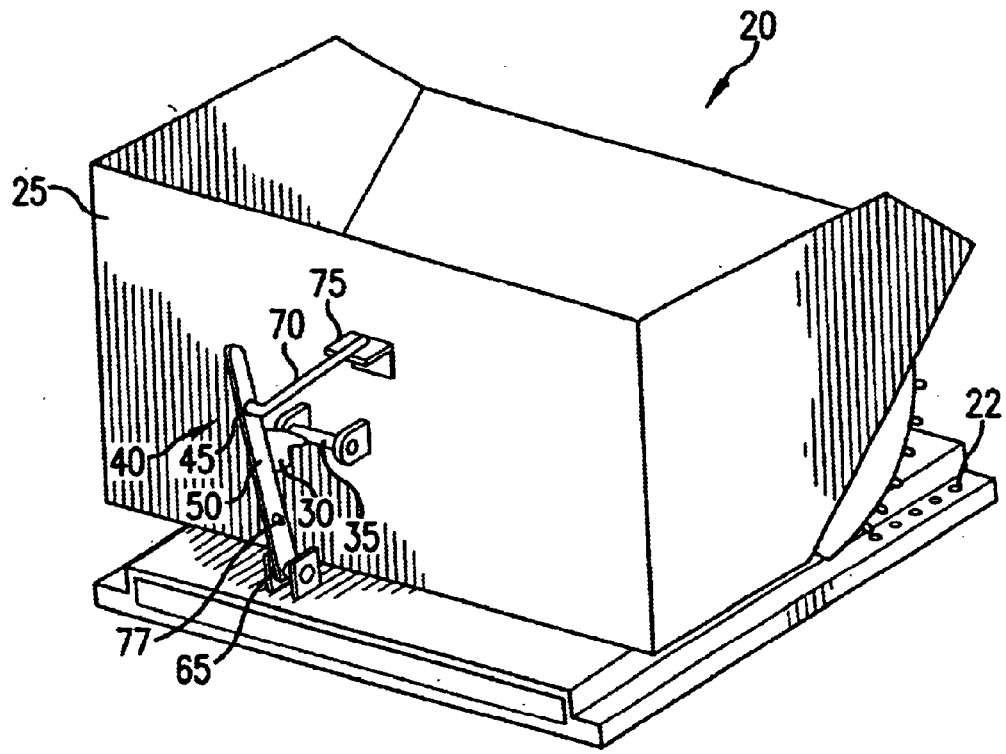
FIG. 25 is a front perspective view of the hopper shown in FIG. 24 in an unlatched position and the counter latch deployed during rearward bias of the hopper.
Figure 25A:
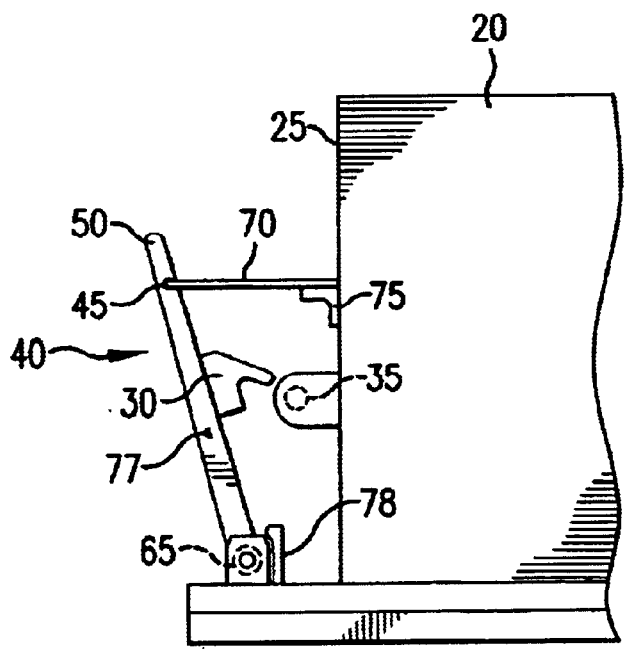
FIG. 25A is a side view of the hopper and deployed counter latch shown in FIG. 25.

FIG. 24, and its closeup view FIG. 24A, show the latched hopper prior to to its dumping initiation mounted on a forklift (not shown) with the forklift mast fully tilted rearward. The dumping process of the hopper 20, is initiated manually by an operator on the ground pulling the trip lever release handle 50 away from the hopper rear panel 25 to release a latch, such as the hopper latching hook 30, from the latching pin 35. While holding the handle 50 back with one hand, the operator deploys the counter latch blocking prop 70 onto the blocking prop cradle 75 with the other hand, to the latch handle 50 blocking position shown in FIGS. 25–25A. The same operator can now climb the forklift, lift the hopper system into the elevated dumping position over a dumpster and tilt the forklift mast forward to cause the hopper 20 to dump its load.

Figure 26:
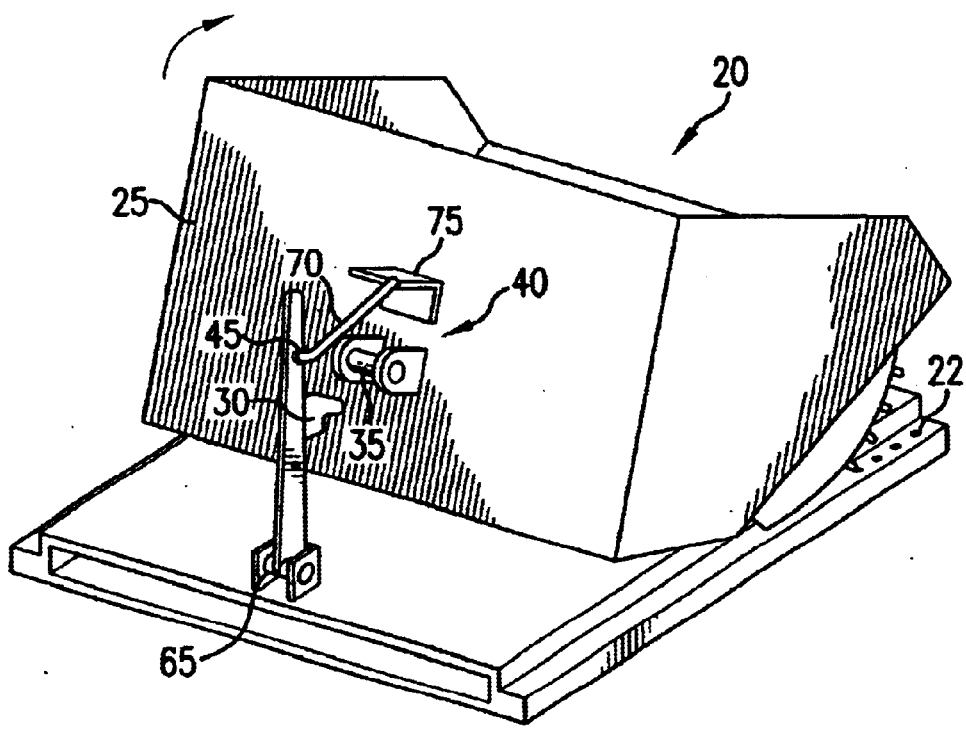
FIG. 26 is a front perspective view of the hopper shown in FIG. 24 in an unlatched position and the counter latch deployed at the beginning of the hopper dump.
Figure 26A:
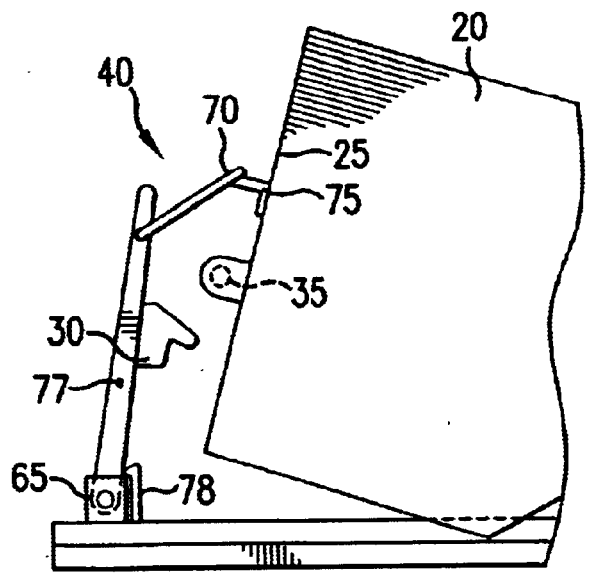
FIG. 26A is a side view of the hopper shown in FIG. 26.
Figure 27:
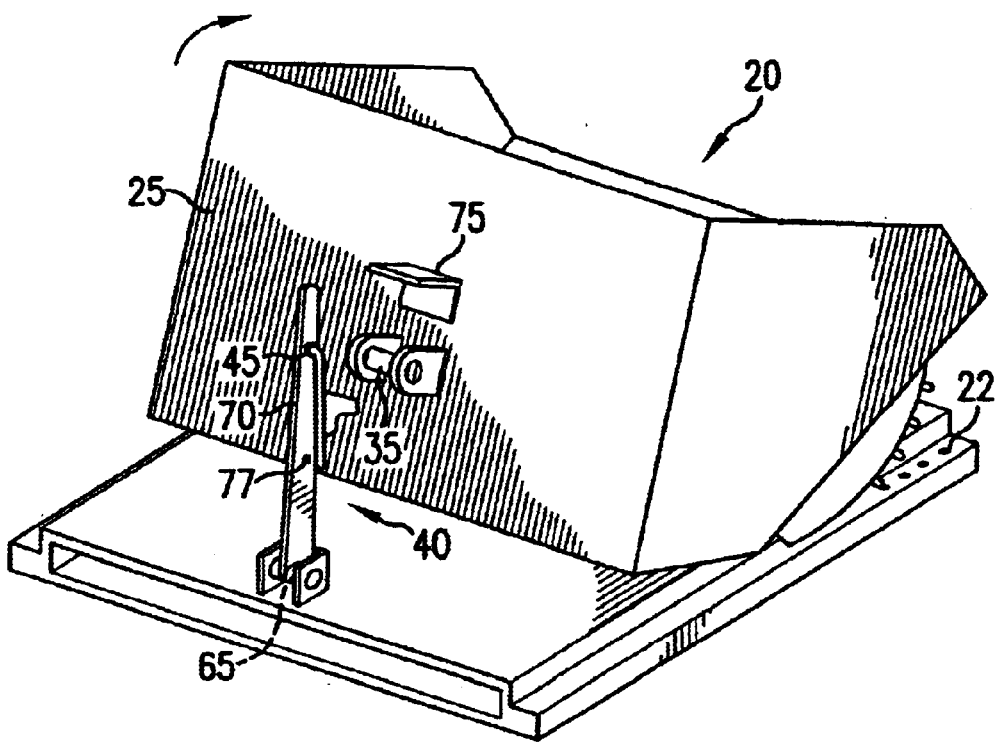
FIG. 27 is a front perspective view of a hopper shown in FIG. 24 in a dumping position and the counter latch disengaged and retracted.
Figure 27A:
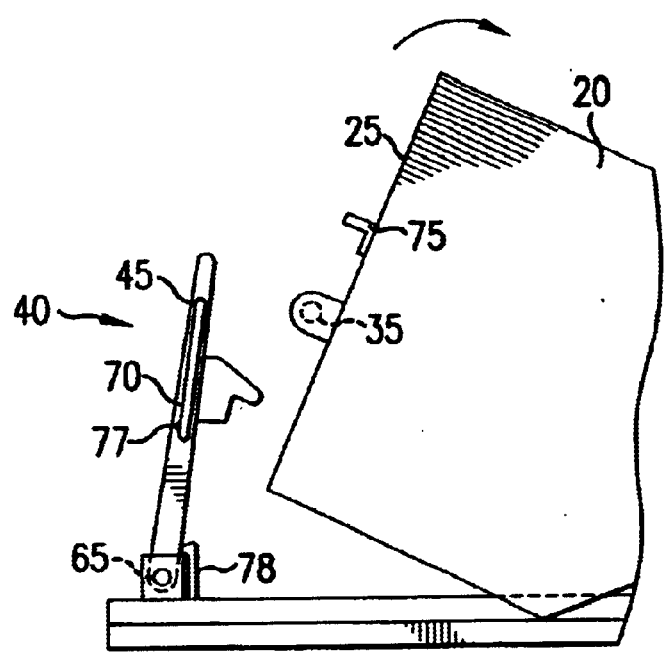
FIG. 27A is a side view of the hopper shown in FIG. 27.

As the hopper 20 in its dumping motion moves forward along its track 22, the rear panel 25 of the hopper, together with its attached blocking prop cradle 75 also move forward. FIGS. 26–26A show that this movement of the blocking prop cradle 75 will pull the blocking prop 70 away from blocking prop cradle 75. When this happens, the handle 50 is returned by its return spring 65 to its hopper relatching position against its stop 78, and the blocking prop 70 of the counter latch 40 is returned by its return spring 45 to its undeployed state against its blocking prop stop 77 on the hopper latch handle 50 as shown in FIGS. 27–27A. This outcome permits the return of the empty hopper to its latched and locked position after dumping by the same process as used by prior art hoppers. Note that the release and return process of handle 50 and the blocking prop 70 is completely automatic requiring no manual input.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A latching system for a hopper having a payload comprising:

a latch positioned with respect to the hopper, the latch moveable between a latched position and an unlatched position; and a counter latch system positioned in a mechanical relationship with the latch to maintain the latch in the unlatched position, a counter latch of the counter latch system moveable between a deployed position keeping the latch in an unlatched position and an undeployed position clear of the latch.

2. The latching system of claim 1 further comprising:

a spring positioned relative to at least one of the latch and the counter latch to responsively return the latch into the latched position as the payload of the hopper is being dumped.

3. The latching system of claim 1 wherein the counter latch system is attached to the latch.

4. The latching system of claim 1 wherein the counter latch is biased against the hopper with a spring.

5. The latching system of claim 4 wherein the latch is biased in the latch position with a latch spring.

6. The latching system of claim 5 wherein the latch further comprises a detent engageable with the counter latch.

7. The latching system of claim 1 wherein the counter latch system comprises:

a prop connected with respect to the latch; and a cradle connected with respect to the hopper, the prop engageable with the cradle for maintaining the latch in the unlatched position.

8. A hopper having a latch moveable between a latched position and an unlatched position, the hopper comprising:

a counter latch system positioned in a mechanical relationship with the latch to maintain the latch in the unlatched position, the counter latch system moveable between a deployed position keeping the latch in an unlatched position and an undeployed position clear of the latch.

9. The hopper of claim 8 wherein the counter latch system comprises:

a prop connected with respect to the latch; and a cradle connected with respect to the hopper, the prop engageable with the cradle for maintaining the latch in the unlatched position.

10. The hopper of claim 8 wherein the counter latch system comprises:

a blocking member connected to the hopper, the blocking member moveable between the deployed position and the undeployed position.

11. The hopper of claim 10 wherein the blocking member comprises one of a rod and a hinge leaf.

12. The hopper of claim 10 wherein the blocking member is biased into an undeployed position.

13. A method of operation of a hopper having a payload and a latch moveable between a latched position and an unlatched position, the method comprising the steps of:

unlatching the latch of the hopper into the unlatched position;

deploying a counter latch to maintain the latch in the unlatched position prior to dumping; and responsively returning the hopper into the latched position as the hopper is returned from a dumping position.

14. The method of claim 13 further comprising the step of:

unlatching the latch into the unlatched position when the hopper is biased at a rearward angle.

15. The method of claim 13 further comprising the step of:

biasing the counter latch away from the latch when the hopper is in the latched position.

16. The method of claim 13 further comprising:

deploying the counter latch from a position on the latch.

17. The method of claim 13 further comprising:

deploying the counter latch from a position on the hopper.

18. The method of claim 13 further comprising:

returning the counter latch to an undeployed position in response to the dumping of the hopper.

19. The method of claim 13 further comprising:

returning the counter latch to an undeployed position using a spring.

20. The method of claim 13 further comprising:

returning the counter latch to an undeployed position using gravity.

21. A method of operation of a hopper having a payload, the method comprising the steps of:

securing a latch of the hopper into a latched position;

loading the hopper;

unlatching the latch of the hopper into an unlatched position;

deploying a counter latch to maintain the latch in the unlatched position prior to dumping;

moving the hopper into a dumping position;

dumping the payload; and responsively returning the hopper into the latched position as the hopper is returned from the dumping of the payload.

22. The method of claim 21 further comprising the step of:

biasing the hopper at a rearward angle prior to unlatching the latch.

23. The method of claim 21 further comprising the step of:

unlatching the latch into the unlatched position when the hopper is biased at a rearward angle.

24. The method of claim 21 further comprising:

propping the counter latch to obstruct movement of the latch into the latched position.

25. The method of claim 21 further comprising the step of:

releasing the counter latch from its position maintaining the latch in the unlatched position as the hopper dumps its payload.

26. The method of claim 21 further comprising the step of:

biasing the counter latch away from the latch when the hopper is in the latched position.

27. The method of claim 21 further comprising the step of:

biasing the hopper into the latched position when a load is applied within the hopper.

28. The method of claim 21 wherein the counter latch is biased against the latch to maintain the latch in the unlatched position.

29. The method of claim 21 wherein components of the latch and components of the counter latch are integrated together.

30. A method of operation of a hopper having a payload, the method comprising the steps of:
- securing a latch of the hopper into a latched position;
- loading the hopper;
- unlatching the latch of the hopper into an unlatched position; and
- using a counter latch system to maintain the latch in the unlatched position prior to dumping.

31. The method of claim 30 further comprising the steps of:
- moving the hopper into a dumping position;
- dumping the payload; and
- responsively returning the hopper into the latched position as the hopper is returned from the dumping of the payload.

* * * * *